US011827833B2

(12) United States Patent
Ohkubo et al.

(10) Patent No.: US 11,827,833 B2
(45) Date of Patent: Nov. 28, 2023

(54) REFRIGERANT-CONTAINING COMPOSITION, AND REFRIGERATING METHOD, REFRIGERATING DEVICE OPERATING METHOD, AND REFRIGERATING DEVICE USING SAID COMPOSITION

(71) Applicant: DAIKIN INDUSTRIES, LTD., Osaka (JP)

(72) Inventors: Shun Ohkubo, Osaka (JP); Yuuki Yotsumoto, Osaka (JP); Mitsushi Itano, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 76 days.

(21) Appl. No.: 17/390,158

(22) Filed: Jul. 30, 2021

(65) Prior Publication Data
US 2021/0355361 A1    Nov. 18, 2021

Related U.S. Application Data

(63) Continuation of application No. PCT/JP2020/003990, filed on Feb. 3, 2020.

(30) Foreign Application Priority Data

Feb. 6, 2019   (JP) ................... 2019-019701

(51) Int. Cl.
*C09K 5/04*      (2006.01)
*C10M 171/00*    (2006.01)
*C10N 20/00*     (2006.01)

(52) U.S. Cl.
CPC ......... *C09K 5/045* (2013.01); *C10M 171/008* (2013.01); *C09K 2205/126* (2013.01); *C09K 2205/40* (2013.01); *C10N 2020/101* (2020.05)

(58) Field of Classification Search
CPC .............. C09K 5/045; C09K 2205/126; C09K 2205/40; C09K 2205/22; C10M 171/008; C10M 2207/2835; C10M 2209/043; C10M 2209/1033; C10N 2020/101; C10N 2030/64; C10N 2040/30
USPC ........................... 252/67, 68, 69; 62/467, 529
See application file for complete search history.

(56) References Cited

U.S. PATENT DOCUMENTS

| 2,309,224 | A | 1/1943 | Terry et al. |
| 6,054,064 | A | 4/2000 | D'Aubarede |
| 6,658,882 | B2 | 12/2003 | Ohama et al. |
| 8,168,077 | B2 | 5/2012 | Spatz |
| 8,961,811 | B2 | 2/2015 | Minor et al. |
| 10,131,827 | B2 | 11/2018 | Fukushima et al. |
| 11,365,335 | B2 | 6/2022 | Itano et al. |
| 11,441,819 | B2 | 9/2022 | Itano et al. |
| 11,447,613 | B2 | 9/2022 | Fabian et al. |
| 2006/0243945 | A1 | 11/2006 | Minor |
| 2010/0122545 | A1 | 5/2010 | Minor et al. |
| 2011/0252801 | A1 | 10/2011 | Minor et al. |
| 2011/0253927 | A1 | 10/2011 | Minor et al. |
| 2011/0258146 | A1 | 10/2011 | Low |
| 2013/0193368 | A1 | 1/2013 | Low |
| 2014/0077123 | A1 | 3/2014 | Fukushima |
| 2015/0027156 | A1 | 1/2015 | Bellamy, Jr. |
| 2015/0051426 | A1 | 2/2015 | Fukushima et al. |
| 2015/0322232 | A1 | 11/2015 | Hong et al. |
| 2015/0322321 | A1 | 11/2015 | Deur-Bert et al. |
| 2015/0376486 | A1 | 12/2015 | Hashimoto et al. |
| 2016/0002518 | A1 | 1/2016 | Taniguchi et al. |
| 2016/0075927 | A1 | 3/2016 | Fukushima |
| 2016/0097569 | A1 | 4/2016 | Matsunaga |
| 2016/0333243 | A1 | 11/2016 | Fukushima et al. |
| 2016/0333244 | A1 | 11/2016 | Fukushima |
| 2016/0340565 | A1 | 11/2016 | Tasaka et al. |
| 2016/0347980 | A1 | 12/2016 | Okamoto |
| 2017/0002245 | A1 | 1/2017 | Fukushima |
| 2017/0058171 | A1 | 3/2017 | Fukushima et al. |
| 2017/0058172 | A1* | 3/2017 | Fukushima .......... C10M 105/32 |
| 2017/0058173 | A1* | 3/2017 | Fukushima ............ C09K 5/045 |
| 2017/0058174 | A1* | 3/2017 | Fukushima ........ C10M 171/008 |

(Continued)

FOREIGN PATENT DOCUMENTS

| CA | 3 015 523 | 9/2017 |
| CN | 102245731 | 11/2011 |

(Continued)

OTHER PUBLICATIONS

Fei Qian, Chief Editor, Marine Auxiliary Engine, 3rd Ed., p. 224-225, Dalian Maritime University Press, Feb. 2008, with English translation.
International Preliminary Report on Patentability dated Jan. 19, 2021 in International (PCT) Application No. PCT/JP2019/027989.
International Search Report dated Sep. 10, 2019 in International (PCT) Application No. PCT/JP2019/027989.
International Preliminary Report on Patentability dated Jan. 19, 2021 in International (PCT) Application No. PCT/JP2019/027988.
International Search Report dated Sep. 10, 2019 in International (PCT) Application No. PCT/JP2019/027988.
International Preliminary Report on Patentability dated Jan. 19, 2021 in International (PCT) Application No. PCT/JP2019/027990.

(Continued)

*Primary Examiner* — Douglas J McGinty
(74) *Attorney, Agent, or Firm* — Wenderoth, Lind & Ponack, L.L.P.

(57) ABSTRACT

The present disclosure provides a composition comprising a refrigerant characterized by having a coefficient of performance (COP) and a refrigerating capacity (Capacity) equivalent to or higher than those of R134a, and having a sufficiently low GWP. The present disclosure is, specifically, a composition comprising a refrigerant, the refrigerant comprising cis-1,2-difluoroethylene (HFO-1132(Z)) and 2,3,3,3-tetrafluoropropene (HFO-1234yf), wherein HFO-1132(Z) is present in an amount of 53.0 to 59.5 mass %, and HFO-1234yf is present in an amount of 47.0 to 40.5 mass %, based on the total mass of IFO-1132(Z) and HFO-1234yf.

9 Claims, 1 Drawing Sheet

(56) References Cited

U.S. PATENT DOCUMENTS

| | | |
|---|---|---|
| 2017/0138642 A1 | 5/2017 | Ueno et al. |
| 2017/0146284 A1 | 5/2017 | Matsunaga et al. |
| 2017/0218241 A1 | 8/2017 | Deur-Bert et al. |
| 2018/0002586 A1 | 1/2018 | Low |
| 2018/0051198 A1 | 2/2018 | Okamoto et al. |
| 2018/0057724 A1 | 3/2018 | Fukushima |
| 2018/0079941 A1 | 3/2018 | Ueno et al. |
| 2018/0320942 A1 | 11/2018 | Hayamizu et al. |
| 2020/0041174 A1 | 2/2020 | Wakabayashi et al. |
| 2020/0048520 A1 | 2/2020 | Fukushima |
| 2020/0079986 A1 | 3/2020 | Fukushima |
| 2020/0326100 A1 | 10/2020 | Ukibune et al. |
| 2020/0326103 A1 | 10/2020 | Kumakura et al. |
| 2020/0326109 A1 | 10/2020 | Kumakura et al. |
| 2020/0385622 A1 | 12/2020 | Itano et al. |
| 2020/0393178 A1 | 12/2020 | Kumakura et al. |
| 2021/0198549 A1 | 7/2021 | Fukushima |
| 2022/0089928 A1 | 3/2022 | Fukushima |
| 2022/0389299 A1 | 12/2022 | Itano et al. |
| 2022/0404070 A1 | 12/2022 | Ohtsuka et al. |
| 2023/0002659 A1 | 1/2023 | Itano et al. |

FOREIGN PATENT DOCUMENTS

| | | |
|---|---|---|
| CN | 104837951 | 8/2015 |
| CN | 105164227 | 12/2015 |
| CN | 105452417 | 3/2016 |
| CN | 106029821 | 10/2016 |
| CN | 106029823 | 10/2016 |
| CN | 106133110 | 11/2016 |
| CN | 106414654 | 2/2017 |
| CN | 106414682 | 2/2017 |
| CN | 107614651 | 1/2018 |
| CN | 107614652 | 1/2018 |
| CN | 108699428 | 10/2018 |
| CN | 111032817 | 4/2020 |
| CN | 111479894 | 7/2020 |
| EP | 0 811 670 | 12/1997 |
| EP | 3 012 556 | 4/2016 |
| EP | 3 101 082 | 12/2016 |
| EP | 3 109 292 | 12/2016 |
| EP | 3 121 242 | 1/2017 |
| EP | 3 153 559 | 4/2017 |
| EP | 3 153 567 | 4/2017 |
| EP | 3 305 869 | 4/2018 |
| EP | 3 423 541 | 1/2019 |
| EP | 3 666 848 | 6/2020 |
| EP | 3 739 018 | 11/2020 |
| EP | 3 825 382 | 5/2021 |
| FR | 3 000 095 | 6/2014 |
| GB | 2530915 | 4/2016 |
| GB | 2566809 | 3/2019 |
| JP | 9-324175 | 12/1997 |
| JP | 2012-510550 | 5/2012 |
| JP | 2013-529703 | 7/2013 |
| JP | WO2014/203353 | 12/2014 |
| JP | 5689068 | 3/2015 |
| JP | WO2015/136977 | 9/2015 |
| JP | 2015-214927 | 12/2015 |
| JP | 2015-229767 | 12/2015 |
| JP | WO2015/186558 | 12/2015 |
| JP | 2016-11423 | 1/2016 |
| JP | 2016-501978 | 1/2016 |
| JP | 2016-028119 | 2/2016 |
| JP | 2016-539208 | 12/2016 |
| JP | 6105511 | 3/2017 |
| JP | 2017-145380 | 8/2017 |
| JP | 2018-104565 | 7/2018 |
| JP | 2018-104566 | 7/2018 |
| JP | 2018-177966 | 11/2018 |
| JP | 2018-177967 | 11/2018 |
| JP | 2018-177968 | 11/2018 |
| JP | 2018-177969 | 11/2018 |
| JP | 2018-179404 | 11/2018 |
| JP | 2018-184597 | 11/2018 |
| JP | 2019-34972 | 3/2019 |
| JP | 2019-034983 | 3/2019 |
| JP | 2019-512031 | 5/2019 |
| JP | 2019-207054 | 12/2019 |
| KR | 10-2011-0099253 | 9/2011 |
| KR | 10-2015-0099530 | 8/2015 |
| KR | 10-2018-0118174 | 10/2018 |
| MX | 2018010417 | 11/2018 |
| WO | 2005/105947 | 11/2005 |
| WO | 2009/036537 | 3/2009 |
| WO | 2010/059677 | 5/2010 |
| WO | 2010/064011 | 6/2010 |
| WO | 2011/163117 | 12/2011 |
| WO | 2014/085973 | 6/2014 |
| WO | 2014/102477 | 7/2014 |
| WO | 2014/178352 | 11/2014 |
| WO | 2014/203356 | 12/2014 |
| WO | 2015/015881 | 2/2015 |
| WO | 2015/054110 | 4/2015 |
| WO | 2015/115252 | 8/2015 |
| WO | 2015/125874 | 8/2015 |
| WO | 2015/125885 | 8/2015 |
| WO | 2015/141678 | 9/2015 |
| WO | 2015/186557 | 12/2015 |
| WO | 2015/186670 | 12/2015 |
| WO | 2015/186671 | 12/2015 |
| WO | 2016/075541 | 5/2016 |
| WO | 2016/182030 | 11/2016 |
| WO | 2016/190177 | 12/2016 |
| WO | 2016/194847 | 12/2016 |
| WO | 2017/122517 | 7/2017 |
| WO | 2018/193974 | 10/2018 |
| WO | 2019/030508 | 2/2019 |
| WO | 2019/123782 | 6/2019 |
| WO | 2019/124396 | 6/2019 |
| WO | 2019/124398 | 6/2019 |
| WO | 2019/124399 | 6/2019 |
| WO | 2019/172008 | 9/2019 |
| WO | 2020/017520 | 1/2020 |
| WO | 2020/017521 | 1/2020 |
| WO | 2020/017522 | 1/2020 |
| WO | 2020/071380 | 4/2020 |
| WO | 2020/256129 | 12/2020 |
| WO | 2020/256131 | 12/2020 |
| WO | 2020/256134 | 12/2020 |

OTHER PUBLICATIONS

International Preliminary Report on Patentability dated Jul. 27, 2021 in International (PCT) Application No. PCT/JP2020/002974.
International Search Report dated Apr. 14, 2020 in International (PCT) Application No. PCT/JP2020/002974.
International Search Report dated Sep. 3, 2019 in International (PCT) Application No. PCT/JP2019/027031.
International Search Report dated Jan. 28, 2020 in International (PCT) Application No. PCT/JP2019/047097.
International Search Report dated Mar. 31, 2020 in International (PCT) Application No. PCT/JP2019/050501.
Extended European Search Report dated Apr. 21, 2021 in European Patent Application No. 19912660.8.
Takahashi et al., "Construction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages, Abstract.
Otsuka et el., "Development of control method of HFO-1123 disproportionation and investigation of probability of HFO-1123 disproportionation", AGC Research Report, 2018, No. 68, pp. 29-33, Abstract.
International Search Report dated Mar. 31, 2020 in International (PCT) Application No. PCT/JP2020/003943.
International Search Report dated Jul. 21, 2020 in International (PCT) Application No. PCT/JP2020/016787.
International Search Report dated Jul. 28, 2020 in International (PCT) Application No. PCT/JP2020/17777.
International Search Report dated Mar. 31, 2020 in International (PCT) Application No. PCT/JP2020/003990.

(56) References Cited

OTHER PUBLICATIONS

Trane Air Conditioning Manual, Chapter X, The Air Conditioning System, pp. 303-359, 1996.

* cited by examiner

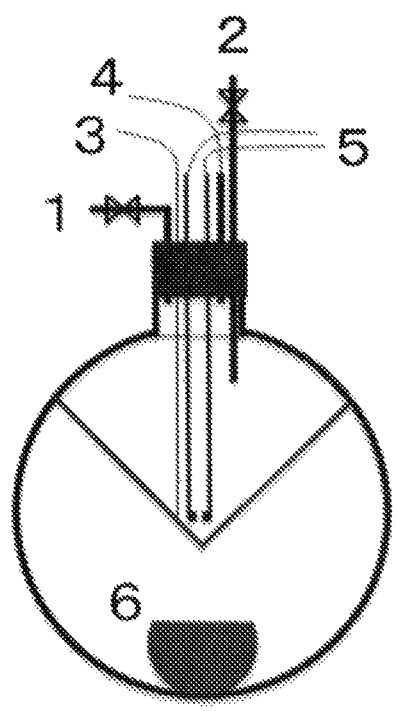

REFRIGERANT-CONTAINING COMPOSITION, AND REFRIGERATING METHOD, REFRIGERATING DEVICE OPERATING METHOD, AND REFRIGERATING DEVICE USING SAID COMPOSITION

TECHNICAL FIELD

The present disclosure relates to a composition comprising a refrigerant; and a refrigeration method, a method for operating a refrigeration apparatus, and a refrigeration apparatus, all of which use the composition.

BACKGROUND ART

Amid worldwide discussion about global warming as a highly serious issue, the development of environmentally friendly air conditioners, refrigeration apparatus, etc. has become increasingly important.

Additionally, various mixed refrigerants that have a low global warming potential (GWP) and that can replace 1,1,1,2-tetrafluoroethane (HFC-134a or R134a), which is used as a refrigerant for air conditioners, such as home air conditioners, have been proposed (e.g., PTL 1).

CITATION LIST

Patent Literature

PTL 1: WO2005/105947

SUMMARY

The present disclosure provides the invention according to the following embodiments.

A composition comprising a refrigerant, the refrigerant comprising cis-1,2-difluoroethylene (HFO-1132(Z)) and 2,3,3,3-tetrafluoropropene (HFO-1234yf), wherein HFO-1132(Z) is present in an amount of 53.0 to 59.5 mass %, and HFO-1234yf is present in an amount of 47.0 to 40.5 mass %, based on the total mass of HFO-1132(Z) and HFO-1234yf.

Advantageous Effects

The composition comprising a refrigerant according to the present disclosure is characterized by having a coefficient of performance (COP) and a refrigerating capacity (Capacity) equivalent to or higher than those of R134a, and having a sufficiently low GWP.

BRIEF DESCRIPTION OF DRAWINGS

FIG. 1 is a diagram illustrating an experimental apparatus for examining flammability (flammable or non-flammable).

DESCRIPTION OF EMBODIMENTS

To solve the above problems, the present inventors conducted extensive research, and found that a composition comprising a mixed refrigerant comprising cis-1,2-difluoroethylene (HFO-1132(Z)) and 2,3,3,3-tetrafluoropropene (HFO-1234yf) has the above characteristics.

The present disclosure has been completed as a result of further research based on the above findings. The present disclosure encompasses the following embodiments.

Definition of Terms

The numerical range expressed by using "to" in the present specification indicates a range that includes the numerical values before and after "to" stated as the minimum and maximum values, respectively.

In the present specification, the terms "comprise" and "contain" include the concepts of "consisting essentially of" and "consisting of."

In the present specification, the term "refrigerant" includes at least compounds that are specified in IS0817 (International Organization for Standardization), and that are given a refrigerant number (ASHRAE number) representing the type of refrigerant with "R" at the beginning; and further includes refrigerants that have characteristics equivalent to those of such refrigerants, even if a refrigerant number is not yet given.

Refrigerants are broadly divided into fluorocarbon-based compounds and non-fluorocarbon-based compounds, in terms of the structure of the compounds. Fluorocarbon-based compounds include chlorofluorocarbons (CFC), hydrochlorofluorocarbons (HCFC), and hydrofluorocarbons (HFC). Non-fluorocarbon-based compounds include propane (R290), propylene (R1270), butane (R600), isobutane (R600a), carbon dioxide (R744), ammonia (R717), and the like.

The term "composition comprising a refrigerant" used in the present specification at least includes:

(1) a refrigerant itself (including a mixture of refrigerants, i.e., a mixed refrigerant);

(2) a composition that can be used for obtaining a working fluid for a refrigeration apparatus by further comprising one or more other components, and mixing with at least a refrigerant oil; and (3) a working fluid for a refrigeration apparatus, containing a refrigerant oil.

Among these three modes, composition (2) is referred to as a "refrigerant composition" in the present specification in order to distinguish it from a refrigerant itself (including a mixed refrigerant). Further, the working fluid for a refrigeration apparatus (3) is referred to as "a refrigerant oil-containing working fluid" in order to distinguish it from the "refrigerant composition."

In the present specification, when the term "alternative" is used in a context in which the first refrigerant is replaced with the second refrigerant, the first type of alternative means that equipment designed for operation using the first refrigerant can be operated using the second refrigerant under optimum conditions, optionally with changes of only a few parts (at least one of the following: refrigerant oil, gasket, packing, expansion valve, dryer, other parts) and equipment adjustment. In other words, this type of alternative means that the same equipment is operated with an alternative refrigerant. Embodiments of this type of alternative include drop-in alternatives, nearly drop-in alternatives, and retrofits, in the order in which the extent of changes and adjustment necessary for replacing the first refrigerant with the second refrigerant is smaller.

The term "alternative" also includes a second type of alternative, which means that equipment designed for operation using the second refrigerant is operated for the same use as the existing use with the first refrigerant by using the second refrigerant. This type of alternative means that the same use is achieved with an alternative refrigerant.

In the present specification, the term "refrigeration apparatus" in the broad sense refers to apparatuses in general that draw heat from an object or space to make its temperature lower than the temperature of the ambient air, and maintain the low temperature. In other words, refrigeration apparatuses in the broad sense refer to conversion apparatuses that gain energy from the outside to do work, and that perform energy conversion, in order to transfer heat from where the temperature is lower to where the temperature is higher. In the present disclosure, "refrigeration apparatus" is synonymous with "heat pump" in the broad sense.

In the present disclosure, the term "refrigeration apparatus" is distinguished from "heat pump" in the narrow sense, depending on the difference in the applied temperature range and operating temperature. In this case, an apparatus whose low-temperature heat source is placed in a temperature range lower than the air temperature may be called a "refrigeration apparatus," while an apparatus whose low-temperature heat source is placed near the air temperature to use the heat-release action caused by driving the refrigeration cycle may be called a "heat pump." Additionally, there are apparatuses that have both the function of refrigeration apparatuses in the narrow sense and the function of heat pumps in the narrow sense, despite them being a single machine, such as air conditioners that provide both a cooling mode and a heating mode. In the present specification, unless otherwise indicated, the terms "refrigeration apparatus" and "heat pump" are used in the broad sense throughout the specification.

In the present specification, the term "temperature glide" can be rephrased as an absolute value of the difference between the starting temperature and the ending temperature of the phase change process of the composition comprising a refrigerant according to the present disclosure within the constituent elements of a heat cycle system.

In the present specification, the term "air-conditioning system for vehicles" is a type of refrigeration apparatus for use in vehicles, such as gasoline vehicles, hybrid vehicles, electric vehicles, and hydrogen vehicles. The air-conditioning system for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, the term "turbo refrigerating machine" is a type of large refrigeration apparatus and refers to a refrigeration apparatus that has a refrigeration cycle in which heat exchange is performed by an evaporator using a liquid refrigerant, the evaporated refrigerant gas is absorbed by a centrifugal compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator. The term "large refrigerating machine" refers to a large air-conditioner that is intended for air conditioning in a unit of a building.

In the present specification, the term "saturation pressure" refers to a pressure of saturated vapor.

In the present specification, the phrase "evaporation temperature in a refrigeration cycle" refers to a temperature at which a refrigerant liquid absorbs heat and becomes vapor in the evaporation step of the refrigeration cycle. The evaporation temperature in a refrigeration cycle can be determined by measuring the temperature of the evaporator inlet and/or the evaporator outlet. The evaporation temperature of a simple refrigerant or azeotropic refrigerant is constant. However, the evaporation temperature of a non-azeotropic refrigerant is an average value of the temperature at the evaporator inlet and the dew point temperature. More specifically, the evaporation temperature of a non-azeotropic refrigerant can be calculated with the following equation.

Evaporation temperature=(evaporator inlet temperature+dew point temperature)/2.

In the present specification, the term "discharge temperature" refers to a temperature of the mixed refrigerant at the outlet of a compressor.

In the present specification, the term "evaporation pressure" refers to a saturation pressure at an evaporation temperature.

In the present specification, the term "condensation pressure" refers to a saturation pressure at a condensation temperature.

In the present specification, the technical meaning of "non-flammable" and "slightly flammable" refers to the following.

In the present specification, "non-flammable" refrigerants refer to those whose worst case formulation for flammability (WCF), which is the most flammable point in the allowable refrigerant concentration range according to the US ANSI/ASHRAE Standard 34-2013, is classified as Class 1.

In the present specification, "slightly flammable" refrigerants refers to those whose WCF formulation is classified as Class 2L according to the US ANSI/ASHRAE Standard 34-2013

In the present specification, "weakly flammable" refrigerants refers to those whose WCF formulation is classified as Class 2 according to ANSI/ASHRAE Standard 34-2013.

In the present specification, the GWP is evaluated based on the values stated in the Fourth Assessment Report of the Intergovernmental Panel on Climate Change (IPCC).

1. Composition

The composition according to the present disclosure comprises a refrigerant. Examples of the refrigerant include Refrigerant 1 and Refrigerant 2. Refrigerant 1 and Refrigerant 2 are described below. In the present specification, "the refrigerant according to the present disclosure" refers to Refrigerant 1 and Refrigerant 2.

1.1 Refrigerant 1

In an embodiment, the refrigerant contained in the composition according to the present disclosure comprises HFO-1132(Z) and HFO-1234yf. This refrigerant may be referred to as "Refrigerant 1."

Refrigerant 1 comprises HFO-1132(Z) in an amount of 53.0 to 59.5 mass % and HFO-1234yf in an amount of 47.0 to 40.5 mass %, based on the total mass of HFO-1132(Z) and HFO-1234yf.

Refrigerant 1 has the above feature and thus has the following characteristics that are desirable as an alternative refrigerant R134a: (1) the GWP is sufficiently low (100 or less); (2) it has a COP equivalent to or higher than that of R134a; (3) it has a refrigerating capacity equivalent to or higher than that of R134a; and (4) it is slightly flammable according to ASHRAE Standards (Class 2L).

In this embodiment, sufficiently low GWP means that the GWP is typically 100 or less, preferably 75 or less, more preferably 50 or less, and even more preferably 25 or less.

When Refrigerant 1 comprises HFO-1132(Z) in an amount exceeding 59.5 mass % based on the total mass of HFO-1132(Z) and HFO-1234yf, Refrigerant 1 is weakly flammable, which is a problem.

From the viewpoint of reducing the electrical power consumed during the operation of a commercially available refrigeration apparatus for R134a, Refrigerant 1 typically has a refrigerating capacity of 95% or more, preferably 98% or more, more preferably 99% or more, even more preferably 100% or more, and particularly preferably 100.5% or more, relative to that of R134a.

Since the GWP is 100 or less, Refrigerant 1 can notably reduce the burden on the environment from a global warming perspective, compared with other general-purpose refrigerants.

Since Refrigerant 1 has a ratio of refrigerating capacity to power consumed in a refrigeration cycle (coefficient of performance (COP)) relative to that of R134a of 100% or more, and is thus applicable to commercially available refrigeration apparatuses for R134a without significant design change.

In Refrigerant 1, the ratio of refrigerating capacity and power consumed in a refrigeration cycle (coefficient of performance (COP)) relative to that of R134a is preferably high, from the viewpoint of energy consumption efficiency. Specifically, the COP relative to that of R134a is preferably 98% or more, more preferably 99% or more, even more preferably 100% or more, and particularly preferably 101% or more.

In Refrigerant 1, it is preferred that HFO-1132(Z) be present in an amount of 53.0 to 59.0 mass %, and HFO-1234yf be present in an amount of 47.0 to 41.0 mass %, based on the total mass of HFO-1132(Z) and HFO-1234yf.

In Refrigerant 1, it is more preferred that HFO-1132(Z) be present in an amount of 54.0 to 59.0 mass %, and HFO-1234yf be present in an amount of 46.0 to 41.0 mass %, based on the total mass of HFO-1132(Z) and HFO-1234yf.

In Refrigerant 1, it is further preferred that HFO-1132(Z) be present in an amount of 55.0 to 59.0 mass %, and HFO-1234yf be present in an amount of 45.0 to 41.0 mass %, based on the total mass of HFO-1132(Z) and HFO-1234yf.

In Refrigerant 1, it is particularly preferred that HFO-1132(Z) be present in an amount of 56.0 to 59.0 mass %, and HFO-1234yf be present in an amount of 44.0 to 41.0 mass %, based on the total mass of HFO-1132(Z) and HFO-1234yf.

Refrigerant 1 may comprise HFO-1132(Z) and HFO-1234yf in such amounts that the sum of their concentrations is usually 99.5 mass % or more. In the present disclosure, the total amount of HFO-1132(Z) and HFO-1234yf is preferably 99.7 mass % or more, more preferably 99.8 mass % or more, and even more preferably 99.9 mass % or more, of entire Refrigerant 1.

Refrigerant 1 may further comprise an additional refrigerant in addition to HFO-1132(Z) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 1. The additional refrigerant is not limited, and may be selected from a wide range of known refrigerants widely used in the field. Refrigerant 1 may comprise one additional refrigerant or two or more additional refrigerants.

In the present disclosure, Refrigerant 1 is preferably used to operate a refrigeration cycle in which the evaporation temperature is −60 to 20° C., from the viewpoint of sufficiently cooling a room and an object to be cooled.

In a refrigeration cycle in which Refrigerant 1 is used, the evaporation temperature is preferably 15° C. or less, more preferably 10° C. or less, further preferably 5° C. or less, and particularly preferably less than 0° C., from the viewpoint of sufficiently cooling a room and an object to be cooled.

In a refrigeration cycle in which Refrigerant 1 is used, the evaporation temperature is preferably −55° C. or more, more preferably −50° C. or more, further preferably −45° C. or more, and particularly preferably −40° C. or more, from the viewpoint of attaining an evaporation pressure of 0.02 MPa or more.

In a refrigeration cycle in which Refrigerant 1 is used, the evaporation temperature is preferably −55° C. to 15° C., more preferably −50° C. to 10° C., further preferably −45° C. to 5° C., and particularly preferably −40° C. to less than 0° C.

It is particularly preferred that Refrigerant 1 consist of HFO-1132(Z) and HFO-1234yf. In other words, the total concentration of HFO-1132(Z) and HFO-1234yf in Refrigerant 1 is particularly preferably 100 mass % of entire Refrigerant 1.

When Refrigerant 1 consists of HFO-1132(Z) and HFO-1234yf, it is more preferred that HFO-1132(Z) be present in an amount of 53.0 to 59.0 mass %, and HFO-1234yf be present in an amount of 47.0 to 40.5 mass %, based on the total mass of HFO-1132(Z) and HFO-1234yf.

When Refrigerant 1 consists of HFO-1132(Z) and HFO-1234yf, it is more preferred that HFO-1132(Z) be present in an amount of 54.0 to 59.0 mass %, and HFO-1234yf be present in an amount of 46.0 to 41.0 mass %, based on the total mass of HFO-1132(Z) and HFO-1234yf.

When Refrigerant 1 consists of HFO-1132(Z) and HFO-1234yf, it is further preferred that HFO-1132(Z) be present in an amount of 55.0 to 59.0 mass %, and HFO-1234yf be present in an amount of 45.0 to 41.0 mass %, based on the total mass of HFO-1132(Z) and HFO-1234yf.

When Refrigerant 1 consists of HFO-1132(Z) and HFO-1234yf, it is particularly preferred that HFO-1132(Z) be present in an amount of 56.0 to 59.0 mass %, and HFO-1234yf be present in an amount of 44.0 to 41.0 mass %, based on the total mass of HFO-1132(Z) and HFO-1234yf.

When Refrigerant 1 consists of HFO-1132(Z) and HFO-1234yf, it is preferred that HFO-1132(Z) be present in an amount of 53.0 to 59.5 mass %, and HFO-1234yf be present in an amount of 47.0 to 40.5 mass %, based on the total mass of HFO-1132(Z) and HFO-1234yf, and that Refrigerant 1 is used to operate a refrigeration cycle in which the evaporation temperature is −55° C. to 15° C.

When Refrigerant 1 consists of HFO-1132(Z) and HFO-1234yf, it is more preferred that HFO-1132(Z) be present in an amount of 54.0 to 59.0 mass %, and HFO-1234yf be present in an amount of 46.0 to 41.0 mass %, based on the total mass of HFO-1132(Z) and HFO-1234yf, and that Refrigerant 1 is used to operate a refrigeration cycle in which the evaporation temperature is −50° C. to 10° C.

When Refrigerant 1 consists of HFO-1132(Z) and HFO-1234yf, it is even more preferred that HFO-1132(Z) be present in an amount of 55.0 to 59.0 mass %, and HFO-1234yf be present in an amount of 45.0 to 41.0 mass %, based on the total mass of HFO-1132(Z) and HFO-1234yf, and that Refrigerant 1 is used to operate a refrigeration cycle in which the evaporation temperature is −45° C. to 5° C.

When Refrigerant 1 consists of HFO-1132(Z) and HFO-1234yf, it is particularly preferred that HFO-1132(Z) be present in an amount of 56.0 to 59.0 mass %, and HFO-1234yf be present in an amount of 44.0 to 41.0 mass %, based on the total mass of HFO-1132(Z) and HFO-1234yf, and that Refrigerant 1 is used to operate a refrigeration cycle in which the evaporation temperature is −40° C. to less than 0° C.

1.2 Refrigerant 2

In an embodiment, the refrigerant contained in the composition according to the present disclosure comprises HFO-1132(Z) and HFO-1234yf, wherein HFO-1132(Z) is present in an amount of 41.0 to 49.2 mass %, and HFO-1234yf is present in an amount of 59.0 to 50.8 mass %, based on the total mass of HFO-1132(Z) and HFO-1234yf. This refrigerant may be referred to as "Refrigerant 2."

Refrigerant 2 has the above feature and thus has the following characteristics that are desirable as an alternative refrigerant R134a: (1) the GWP is sufficiently low (100 or less); (2) it has a COP equivalent to or higher than that of R134a; (3) it has a refrigerating capacity equivalent to or higher than that of R134a; and (4) it is slightly flammable according to ASHRAE Standards (Class 2L).

In this embodiment, sufficiently low GWP means that the GWP is typically 100 or less, preferably 75 or less, more preferably 50 or less, and even more preferably 25 or less.

Since the GWP is 100 or less, Refrigerant 2 can notably reduce the burden on the environment from a global warming perspective, compared with other general-purpose refrigerants.

From the viewpoint of reducing the electrical power consumed during the operation of a commercially available refrigeration apparatus for R134a, Refrigerant 2 typically has a refrigerating capacity of 95% or more, preferably 98% or more, more preferably 99% or more, even more preferably 100% or more, and particularly preferably 101% or more, relative to that of R134a.

Refrigerant 2 has a ratio of refrigerating capacity to power consumed in a refrigeration cycle (coefficient of performance (COP)) relative to that of R134a of 100% or more, and is thus applicable to commercially available refrigeration apparatuses for R134a without significant design change.

In Refrigerant 2, the ratio of refrigerating capacity to power consumed in a refrigeration cycle (coefficient of performance (COP)) relative to that of R134a is preferably high, from the viewpoint of energy consumption efficiency. Specifically, the COP relative to that of R134a is preferably 98% or more, more preferably 99% or more, even more preferably 100% or more, and particularly preferably 101% or more.

In Refrigerant 2, it is preferred that HFO-1132(Z) be present in an amount of 42.0 to 49.2 mass %, and HFO-1234yf be present in an amount of 58.0 to 50.8 mass %, based on the total mass of HFO-1132(Z) and HFO-1234yf.

In Refrigerant 2, it is preferred that HFO-1132(Z) be present in an amount of 43.0 to 49.2 mass %, and HFO-1234yf be present in an amount of 57.0 to 50.8 mass %, based on the total mass of HFO-1132(Z) and HFO-1234yf.

In Refrigerant 2, it is further preferred that HFO-1132(Z) be present in an amount of 44.0 to 49.0 mass %, and HFO-1234yf be present in an amount of 56.0 to 51.0 mass %, based on the total mass of HFO-1132(Z) and HFO-1234yf.

Refrigerant 2 may comprise HFO-1132(Z) and HFO-1234yf in such amounts that the sum of their concentrations is usually 99.5 mass % or more. In the present disclosure, the total amount of HFO-1132(Z) and HFO-1234yf is preferably 99.7 mass % or more, more preferably 99.8 mass % or more, and even more preferably 99.9 mass % or more, of entire Refrigerant 2.

Refrigerant 2 may further comprise an additional refrigerant in addition to HFO-1132(Z) and HFO-1234yf as long as the above characteristics are not impaired. In this case, the content of the additional refrigerant is preferably 0.5 mass % or less, more preferably 0.3 mass % or less, even more preferably 0.2 mass % or less, and particularly preferably 0.1 mass % or less, of entire Refrigerant 2. The additional refrigerant is not limited and may be selected from a wide range of known refrigerants widely used in the field. Refrigerant 2 may comprise one additional refrigerant or two or more additional refrigerants.

In the present disclosure, Refrigerant 2 is preferably used to operate a refrigeration cycle in which the evaporation temperature is −60 to 20° C., from the viewpoint of sufficiently cooling a room and an object to be cooled.

In a refrigeration cycle in which Refrigerant 2 is used, the evaporation temperature is preferably 15° C. or less, more preferably 10° C. or less, further preferably 5° C. or less, and particularly preferably less than 0° C., from the viewpoint of sufficiently cooling a room and an object to be cooled.

In a refrigeration cycle in which Refrigerant 2 is used, the evaporation temperature is preferably −55° C. or more, more preferably −50° C. or more, further preferably −45° C. or more, and particularly preferably −40° C. or more, from the viewpoint of attaining an evaporation pressure of 0.02 MPa or more.

In a refrigeration cycle in which Refrigerant 2 is used, the evaporation temperature is preferably −55° C. to 15° C., more preferably −50° C. to 10° C., further preferably −45° C. to 5° C., and particularly preferably −40° C. to less than 0° C.

It is particularly preferred that Refrigerant 2 consist of HFO-1132(Z) and HFO-1234yf. In other words, the total concentration of HFO-1132(Z) and HFO-1234yf in Refrigerant 2 is particularly preferably 100 mass % of entire Refrigerant 2.

When Refrigerant 2 consists of HFO-1132(Z) and HFO-1234yf, it is preferred that HFO-1132(Z) be present in an amount of 41.0 to 49.2 mass %, and HFO-1234yf be present in an amount of 59.0 to 50.8 mass %, based on the total mass of HFO-1132(Z) and HFO-1234yf.

When Refrigerant 2 consists of HFO-1132(Z) and HFO-1234yf, it is preferred that HFO-1132(Z) be present in an amount of 42.0 to 49.2 mass %, and HFO-1234yf be present in an amount of 58.0 to 50.8 mass %, based on the total mass of HFO-1132(Z) and HFO-1234yf.

When Refrigerant 2 consists of HFO-1132(Z) and HFO-1234yf, it is further preferred that HFO-1132(Z) be present in an amount of 43.0 to 49.2 mass %, and HFO-1234yf be present in an amount of 57.0 to 50.8 mass %, based on the total mass of HFO-1132(Z) and HFO-1234yf.

When Refrigerant 2 consists of HFO-1132(Z) and HFO-1234yf, it is particularly preferred that HFO-1132(Z) be present in an amount of 44.0 to 49.0 mass %, and HFO-1234yf be present in an amount of 56.0 to 51.0 mass %, based on the total mass of HFO-1132(Z) and HFO-1234yf.

When Refrigerant 2 consists of HFO-1132(Z) and HFO-1234yf, it is preferred that HFO-1132(Z) be present in an amount of 41.0 to 49.2 mass %, and HFO-1234yf be present in an amount of 59.0 to 50.8 mass %, based on the total mass of HFO-1132(Z) and HFO-1234yf, and that Refrigerant 2 is used to operate a refrigeration cycle in which the evaporation temperature is −55° C. to 15° C.

When Refrigerant 2 consists of HFO-1132(Z) and HFO-1234yf, it is more preferred that HFO-1132(Z) be present in an amount of 42.0 to 49.2 mass %, and HFO-1234yf be present in an amount of 58.0 to 50.8 mass %, based on the total mass of HFO-1132(Z) and HFO-1234yf, and that Refrigerant 2 is used to operate a refrigeration cycle in which the evaporation temperature is −50° C. to 10° C.

When Refrigerant 2 consists of HFO-1132(Z) and HFO-1234yf, it is further preferred that HFO-1132(Z) be present in an amount of 43.0 to 49.2 mass %, and HFO-1234yf be present in an amount of 57.0 to 50.8 mass %, based on the total mass of HFO-1132(Z) and HFO-1234yf, and that Refrigerant 2 is used to operate a refrigeration cycle in which the evaporation temperature is −45° C. to 5° C.

When Refrigerant 2 consists of HFO-1132(Z) and HFO-1234yf, it is particularly preferred that HFO-1132(Z) be present in an amount of 44.0 to 49.0 mass %, and HFO-1234yf be present in an amount of 56.0 to 51.0 mass %, based on the total mass of HFO-1132(Z) and HFO-1234yf, and that Refrigerant 2 is used to operate a refrigeration cycle in which the evaporation temperature is −40° C. to less than 0° C.

1.3 Application

The composition containing the refrigerant according to the present disclosure can be widely used as a working fluid for known refrigerant applications in 1) a refrigeration method comprising operating a refrigeration cycle and 2) a method for operating a refrigeration apparatus that operates a refrigeration cycle.

The refrigeration cycle herein means performing energy conversion by circulating in the refrigeration apparatus the refrigerant (Refrigerant 1 or 2 according to the present disclosure) in the state of the single refrigerant, or in the state of a refrigerant composition or a refrigerant-oil-containing working fluid explained below, through a compressor.

The present disclosure includes use of the refrigerant (or composition comprising the refrigerant) according to the present disclosure in a refrigeration method, use of the refrigerant (or composition comprising the refrigerant) according to the present disclosure in a method of operating a refrigeration apparatus etc., and a refrigeration apparatus or the like comprising the refrigerant (or composition comprising the refrigerant) according to the present disclosure.

It is preferable that the composition containing Refrigerant 1 according to the present disclosure is used to operate a refrigeration cycle in which the evaporation temperature is −60 to 20° C., from the viewpoint of sufficiently cooling a room and an object to be cooled. Further, by using the composition containing Refrigerant 1 according to the present disclosure for operating a refrigeration cycle in which the evaporation temperature is −60 to 20° C., the COP during the operation of a commercially available refrigeration apparatus for R134a is increased, which reduces electrical power to be consumed In a refrigeration cycle in which a composition containing Refrigerant 1 is used, the evaporation temperature is preferably 15° C. or less, more preferably 10° C. or less, further preferably 5° C. or less, and particularly preferably less than 0° C., from the viewpoint of sufficiently cooling a room and an object to be cooled.

In a refrigeration cycle in which a composition containing Refrigerant 1 is used, the evaporation temperature is preferably −55° C. or more, more preferably −50° C. or more, further preferably −45° C. or more, and particularly preferably −40° C. or more, from the viewpoint of attaining an evaporation pressure of 0.02 MPa or more.

In the refrigeration cycle in which the composition containing Refrigerant 1 is used, the evaporation temperature is preferably −55° C. to 15° C., more preferably −50° C. to 10° C., even more preferably −45° C. to 5° C., and particularly preferably −40° C. to less than 0° C.

The composition containing Refrigerant 1 is preferably used for operating a refrigeration cycle in which the condensation temperature is 0 to 70° C.

In the refrigeration cycle in which the composition containing Refrigerant 1 is used, from the viewpoint of extending the life of refrigeration apparatus, the condensation temperature is preferably 70° C. or less, more preferably 60° C. or less, even more preferably 55° C. or less, and particularly preferably 50° C. or less.

In the refrigeration cycle in which the composition containing Refrigerant 1 is used, from the viewpoint of preventing the condensation of an outdoor unit, the condensation temperature is preferably 0° C. or more, more preferably 5° C. or more, even more preferably 10° C. or more, and particularly preferably 15° C. or more.

In the present disclosure, it is also possible to structure an apparatus for refrigeration cycle in which the composition containing Refrigerant 1 is circulated through a compressor.

The composition containing Refrigerant 2 is preferably used for operating a refrigeration cycle in which the evaporation temperature is −60 to 20° C., from the viewpoint of sufficiently cooling a room and an object to be cooled.

In the refrigeration cycle in which the composition containing Refrigerant 2 is used, from the viewpoint of sufficiently cooling a room and an object to be cooled, the evaporation temperature is preferably 15° C. or less, more preferably 10° C. or less, even more preferably 5° C. or less, and particularly preferably less than 0° C.

In the refrigeration cycle in which the composition containing Refrigerant 2 is used, the evaporation temperature is preferably −55° C. or more, more preferably −50° C. or more, even more preferably −45° C. or more, and particularly preferably −40° C. or more, from the viewpoint of setting the evaporation temperature to 0.02 MPa or more.

In the refrigeration cycle in which the composition containing Refrigerant 2 is used, the evaporation temperature is preferably −55° C. to 15° C., more preferably −50° C. to 10° C., even more preferably −45° C. to 5° C., and particularly preferably −40° C. to less than 0° C.

The composition containing Refrigerant 2 is preferably used to operate a refrigeration cycle in which the condensation temperature is 0 to 70° C.

In the refrigeration cycle in which the composition containing Refrigerant 2 is used, from the viewpoint of extending the life of the refrigeration apparatus, the condensation temperature is preferably 70° C. or less, more preferably 60° C. or less, even more preferably 55° C. or less, and particularly preferably 50° C. or less.

In the refrigeration cycle in which the composition containing Refrigerant 2 is used, from the viewpoint of preventing condensation of an outdoor unit, the condensation temperature is preferably 0° C. or more, more preferably 5° C. or more, even more preferably 10° C. or more, and particularly preferably 15° C. or more.

In the present disclosure, it is also possible to structure an apparatus for refrigeration cycle in which the composition containing Refrigerant 2 is circulated through a compressor.

Preferable examples of refrigeration apparatuses in which Refrigerant 1 or 2 (or a composition containing the refrigerant) according to the present disclosure can be used include at least one members selected from the group consisting of air-conditioning systems, refrigerators, freezers, water coolers, ice makers, refrigerated showcases, freezing showcases, freezing and refrigerating units, refrigerating machines for freezing and refrigerating warehouses, air-conditioning systems for vehicles, turbo refrigerating machines, or screw refrigerating machines.

The composition according to the present disclosure is suitably used as an alternative refrigerant for R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R438A, R448A, R449A, R449B, R450A, R454A, R454C, R455A, R465A, R502, R507, R513A, R513B, R515A, or R515B.

Of these, since the composition of the present disclosure has a coefficient of performance (COP) and a refrigerating capacity equivalent to or higher than those of R134a, and has a sufficiently low GWP, it is particularly suitable as an alternative refrigerant of R134a.

2. Refrigerant Composition

The refrigerant composition of the present invention at least includes the refrigerant according to the present disclosure, and can be used for the same applications as the refrigerant of the present disclosure.

Further, the refrigerant composition according to the present disclosure is mixed with at least a refrigerant oil. The refrigerant composition can thereby be used for obtaining a working fluid for a refrigeration apparatus.

The refrigerant composition according to the present disclosure further comprises at least one other component in addition to the refrigerant of the present disclosure. The refrigerant composition according to the present disclosure may optionally comprise at least one of the other components described below.

As described above, when the refrigerant composition according to the present disclosure is used as a working fluid for a refrigeration apparatus, it is usually mixed with at least a refrigerant oil for use.

Preferably, the refrigerant composition according to the present disclosure is substantially free from refrigerant oil. Specifically, in the refrigerant composition according to the present disclosure, the amount of refrigerant oil relative to the entire refrigerant composition is preferably 0 to 1 mass %, more preferably 0 to 0.5 mass %, even more preferably 0 to 0.25 mass %, and particularly preferably 0 to 0.1 mass %.

2.1 Water

The refrigerant composition according to the present disclosure may comprise a small amount of water.

The water content in the refrigerant composition is preferably 0 to 0.1 mass %, more preferably 0 to 0.075 mass %, even more preferably 0 to 0.05 mass %, and particularly preferably 0 to 0.025 mass % relative to the entire refrigerant.

A small amount of water contained in the refrigerant composition stabilizes double bonds in the molecules of unsaturated fluorocarbon-based compounds that can be present in the refrigerant; and makes it less likely that the unsaturated fluorocarbon-based compounds will be oxidized, thus increasing the stability of the refrigerant composition.

2.2 Tracer

A tracer is added to the refrigerant composition according to the present disclosure at a detectable concentration so that when the composition has been diluted, contaminated, or undergone some other changes, the tracer can trace the changes.

The refrigerant composition according to the present disclosure may comprise a single tracer, or two or more tracers.

The tracer is not limited, and can be suitably selected from typically used tracers. Preferably, a compound that cannot become an impurity inevitably mixed into the refrigerant of the present disclosure can be selected as a tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxides ($N_2O$). Of these, hydrofluorocarbons, hydrochlorofluorocarbons, chlorofluorocarbons, hydrochlorocarbons, fluorocarbons, and fluoroethers are preferred.

Specifically, the following compounds (hereinbelow sometimes referred to as "tracer compounds") are more preferred as tracers.

HCC-40 (chloromethane, $CH_3Cl$),
HFC-41 (fluoromethane, $CH_3F$),
HFC-161 (fluoroethane, $CH_3CH_2F$),
HFC-245fa (1,1,1,3,3-pentafluoropropane, $CF_3CH_2CHF_2$),
HFC-236fa (1,1,1,3,3,3-hexafluoropropane, $CF_3CH_2CF_3$),
HFC-236ea (1,1,1,2,3,3-hexafluoropropane, $CF_3CHFCHF_2$),
HCFC-22 (chlorodifluoromethane, $CHClF_2$),
HCFC-31 (chlorofluoromethane, $CH_2ClF$),
CFC-1113 (chlorotrifluoroethylene, $CF_2=CClF$),
HFE-125 (trifluoromethyl difluoro methyl ether, $CF_3OCHF2$),
HFE-134a (trifluoromethyl fluoromethyl ether, $CF_3OCH_2F$),
HFE-143a (trifluoromethyl methyl ether, $CF_3OCH_3$),
HFE-227ea (trifluoromethyl tetrafluoro ethyl ether, $CF_3OCHFCF_3$), and
HFE-236fa (trifluoromethyl trifluoroethyl ether, $CF_3OCH_2CF_3$).

The tracer compound can be present in the refrigerant composition in a total concentration of 10 to 1000 ppm. The tracer compound is preferably present in the refrigerant composition in a total concentration of 30 to 500 ppm, more preferably 50 to 300 ppm, even more preferably 75 to 250 ppm, and particularly preferably 100 to 200 ppm.

2.3 Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from typically used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferred.

2.4 Stabilizer

The refrigerant composition according to the present disclosure may comprise a single stabilizer, or two or more stabilizers.

The stabilizer is not limited, and can be suitably selected from typically used stabilizers.

Examples of stabilizers include nitro compounds, ethers, and amines.

Examples of nitro compounds include aliphatic nitro compounds, such as nitromethane and nitroethane, and aromatic nitro compounds, such as nitro benzene and nitro styrene.

Examples of ethers include 1,4-dioxane.

Examples of amines include 2,2,3,3,3-pentafluoropropylamine and diphenyl amine.

Examples of stabilizers also include butylhydroxyxylene and benzotriazole, in addition to nitro compounds, ethers, and amines.

The amount of the stabilizer is not limited. The amount of the stabilizer is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

The stability of the refrigerant composition according to the present disclosure can be evaluated by a commonly used method without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

2.5 Polymerization Inhibitor

The refrigerant composition according to the present disclosure may comprise a single polymerization inhibitor, or two or more polymerization inhibitors.

The polymerization inhibitor is not limited, and can be suitably selected from typically used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The amount of the polymerization inhibitor is not limited. The amount of the polymerization inhibitor is usually 0.01 to 5 mass %, preferably 0.05 to 3 mass %, more preferably 0.1 to 2 mass %, even more preferably 0.25 to 1.5 mass %, and particularly preferably 0.5 to 1 mass %, relative to the entire refrigerant.

2.6 Other Components that can be Contained in Refrigerant Composition

The refrigerant composition according to the present disclosure can also contain the following components.

For example, fluorinated hydrocarbons that are different from the refrigerants mentioned above can be contained. Examples of fluorinated hydrocarbons used as other components are not limited. At least one fluorinated hydrocarbon selected from the group consisting of HCFC-1122, HCFC-124, and CFC-1113 can be used.

As another component, at least one halogenated organic compound represented by formula (A): $C_mH_nX_p$, wherein each X is independently fluorine, chlorine, or bromine; m is L or 2; 2m+2 is greater than or equal to n+p; and p is greater than or equal to 1 can be contained. The halogenated organic compound is not limited, and preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, and trifluoroethylene.

As another component, at least one organic compound represented by formula (B): $C_mH_nX_p$, wherein each X is independently an atom other than a halogen atom; m is 1 or 2; 2m+2 is greater than or equal to n+p; and p is greater than or equal to 1 can be contained. The organic compound is not limited, and preferable examples include propane and isobutane.

The amounts of the fluorinated hydrocarbon, halogenated organic compound represented by formula (A), and organic compound represented by formula (B) are not limited. The total amount of these is preferably 0.5 mass % or less, more preferably 0.3 mass % or less, and particularly preferably 0.1 mass % or less, relative to the total amount of the refrigerant composition.

3. Refrigerant-Oil-Containing Working Fluid

The refrigerant-oil-containing working fluid according to the present disclosure at least includes the refrigerant or the refrigerant composition according to the present disclosure, and a refrigerant oil, and is used as a working fluid in a refrigeration apparatus. Specifically, the refrigerant-oil-containing working fluid according to the present disclosure can be obtained by mixing together the refrigerant or refrigerant composition with a refrigerant oil used in a compressor of a refrigeration apparatus.

The amount of the refrigerant oil is not limited, and is usually 10 to 50 mass %, preferably 12.5 to 45 mass %, more preferably 15 to 40 mass %, even more preferably 17.5 to 35 mass %, and particularly preferably 20 to 30 mass %, relative to the entire refrigerant-oil-containing working fluid.

3.1 Refrigerant Oil

The composition according to the present disclosure may comprise a single refrigerant oil, or two or more refrigerant oils.

The refrigerant oil is not limited, and can be suitably selected from typically used refrigerant oils. In this case, refrigerant oils that are superior in increasing action on the miscibility with the mixture of the refrigerant according to the present disclosure (mixed refrigerant according to the present disclosure) and stability of the mixed refrigerant, for example, are suitably selected as necessary.

The base oil of the refrigerant oil is preferably, for example, at least one member selected from the group consisting of polyalkylene glycols (PAG), polyol esters (POE), and polyvinyl ethers (PVE).

The refrigerant oil may further comprise an additive in addition to the base oil.

The additive may be at least one member selected from the group consisting of antioxidants, extreme-pressure agents, acid scavengers, oxygen scavengers, copper deactivators, anticorrosive agents, oily agents, and antifoaming agents.

A refrigerant oil with a kinematic viscosity of 5 to 400 cSt at 40° C. is preferable from the standpoint of lubrication.

The refrigerant-oil-containing working fluid according to the present disclosure may further optionally comprise at least one additive. Examples of additives include compatibilizing agents described below.

3.2 Compatibilizing Agent

The refrigerant-oil-containing working fluid according to the present disclosure may comprise a single compatibilizing agent, or two or more compatibilizing agents.

The compatibilizing agent is not limited, and can be suitably selected from typically used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkane. Of these, a polyoxyalkylene glycol ether is preferred.

Example

A more specific explanation is given below with reference to Examples. However, the present disclosure is not limited to the following Examples.

Test Example 1-1

The GWP of each mixed refrigerant shown in Examples 1-1 to 1-3, Comparative Examples 1-1 to 1-6, and Reference Example 1-1 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.
Air-Conditioning Conditions
Evaporation temperature: 10° C.
Condensation temperature: 40° C.
Superheating temperature: 20 K
Supercooling temperature: 0 K
Compressor efficiency: 70%

The "evaporation temperature of 10° C." means that the evaporation temperature of the mixed refrigerant in the evaporator provided in the refrigeration apparatus is 10° C. Further, the "condensation temperature of 40° C." means that the condensation temperature of the mixed refrigerant in the condenser provided in the refrigeration apparatus is 40° C.

Table 1 shows the results of Test Example 1-1. Table 1 shows Examples and Comparative Examples with regard to Refrigerant 1 of the present disclosure. In Table 1, the "COP ratio" and the "refrigerating capacity ratio" refer to a ratio (%) relative to R134a. In Table 1, the "saturation pressure (40° C.)" refers to a saturation pressure at a saturation temperature of 40° C. In Table 1, the "discharge temperature (° C.)" refers to a temperature at which the highest temperature is attained in the refrigeration cycle according to the refrigeration cycle theoretical calculations of the mixed refrigerant.

The coefficient of performance (COP) was calculated according to the following equation.

COP=(refrigerating capacity or heating capacity)/
amount of electrical power consumed The compression ratio was calculated according to the following equation.

Compression ratio=condensation pressure (Mpa)/
evaporation pressure (Mpa)

The flammability of the mixed refrigerant was determined by specifying the fractionation of the mixed refrigerant to the WCF concentration, and measuring the burning rate according to ANSI/ASHRAE Standard 34-2013. The flammability of R134a was determined by specifying the composition of R134a to the WCF concentration, and measuring the burning rate according to ANSI/ASHRAE Standard 34-2013.

The mixed refrigerant with a burning rate of 0 cm/s to 10 cm/s was classified as Class 2L (slightly flammable), and the mixed refrigerant with a burning rate of more than 10 cm/s was classified as Class 2 (weakly flammable). R134a with no flame propagation was classified as Class 1 (non-flammable). In Table 1, the ASHRAE flammability classification shows the results based on these criteria.

The burning rate test was performed as follows. First, a mixed refrigerant having a purity of 99.5% or more was used, and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 nm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.
Test Conditions
Test vessel: 280-mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds t0.05 seconds
Evaluation Criteria:
When the flame spread at an angle of more than 90° from the ignition point, flame propagation was evaluated as present (flammable).
When the flame spread at an angle of 90° or less from the ignition point, flame propagation was evaluated as absent (non-flammable).

TABLE 1

| Item | | Unit | Reference Example 1-1 (R134a) | Comparative Example 1-1 | Comparative Example 1-2 | Comparative Example 1-3 | Example 1-1 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 70.7 | 70.7 | 73.4 | 76.3 | 76.9 |
| Saturation pressure (40° C.) | | MPa | 1.017 | 1.004 | 0.998 | 0.991 | 0.990 |
| Evaporation pressure | | MPa | 0.415 | 0.427 | 0.422 | 0.418 | 0.417 |
| Compression ratio | | — | 2.5 | 2.4 | 2.4 | 2.4 | 2.4 |

TABLE 1-continued

| | | | | | | |
|---|---|---|---|---|---|---|
| COP ratio (relative to R134a) | % | 100.0 | 100.0 | 100.2 | 100.3 | 100.4 |
| Refrigerating capacity ratio (relative to R134a) | % | 100.0 | 98.0 | 98.1 | 98.3 | 98.3 |
| ASHRAE flammability classification | — | Class 1 | Class 2L | Class 2L | Class 2L | Class 2L |

| Item | | Example 1-2 | Example 1-3 | Comparative Example 1-4 | Comparative Example 1-5 | Comparative Example 1-6 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |
| | HFC-134a | 0 | 0 | 0 | 0 | 0 |
| GWP (AR4) | | 7 | 8 | 8 | 8 | 10 |
| Discharge temperature | | 77.7 | 78.5 | 78.8 | 81.6 | 90.3 |
| Saturation pressure (40° C.) | | 0.988 | 0.987 | 0.986 | 0.981 | 0.968 |
| Evaporation pressure | | 0.416 | 0.415 | 0.415 | 0.411 | 0.402 |
| Compression ratio | | 2.4 | 2.4 | 2.4 | 2.4 | 2.4 |
| COP ratio (relative to R134a) | | 100.4 | 100.4 | 100.4 | 100.5 | 100.4 |
| Refrigerating capacity ratio (relative to R134a) | | 98.3 | 98.3 | 98.3 | 98.4 | 98.5 |
| ASHRAE flammability classification | | Class 2L | Class 2L | Class 2 | Class 2 | Class 2 |

Test Example 1-2

The GWP of each mixed refrigerant shown in Examples 1-4 to 1-6, Comparative Examples 1-7 to 1-12, and Reference Example 1-2 (R134a) was evaluated based on the values in the Fourth Assessment Report of the IPCC.

The COP, refrigerating capacity, discharge temperature, saturation pressure at a saturation temperature of 45° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: 5° C.
Condensation temperature: 45° C.
Superheating temperature: 5 K
Supercooling temperature: 5 K
Compressor efficiency: 70%

The definitions of the terms are the same as those in Test Example 1-1.

Table 2 shows the results of Test Example 1-2. Table 2 shows Examples and Comparative Examples with regard to Refrigerant 1 of the present disclosure. In Table 2, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 2

| Item | | Unit | Reference Example 1-2 (R134a) | Comparative Example 1-7 | Comparative Example 1-8 | Comparative Example 1-9 | Example 1-4 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 63.8 | 63.9 | 67.3 | 71.2 | 71.9 |
| Saturation pressure (45° C.) | | MPa | 1.160 | 1.139 | 1.133 | 1.126 | 1.125 |
| Evaporation pressure | | MPa | 0.350 | 0.363 | 0.359 | 0.355 | 0.354 |
| Compression ratio | | — | 3.3 | 3.1 | 3.2 | 3.2 | 3.2 |
| COP ratio (relative to R134a) | | % | 100.0 | 100.0 | 100.7 | 101.4 | 101.5 |
| Refrigerating capacity ratio (relative to R134a) | | % | 100.0 | 98.8 | 99.7 | 100.5 | 100.6 |
| ASHRAE flammability classification | | — | Class 1 | Class 2L | Class 2L | Class 2L | Class 2L |

TABLE 2-continued

| Item | | Example 1-5 | Example 1-6 | Comparative Example 1-10 | Comparative Example 1-11 | Comparative Example 1-12 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |
| | HFC-134a | 0 | 0 | 0 | 0 | 0 |
| GWP (AR4) | | 7 | 8 | 8 | 8 | 10 |
| Discharge temperature | | 72.9 | 74.0 | 74.4 | 78.0 | 89.4 |
| Saturation pressure (45° C.) | | 1.123 | 1.121 | 1.121 | 1.115 | 1.101 |
| Evaporation pressure | | 0.353 | 0.352 | 0.352 | 0.349 | 0.340 |
| Compression ratio | | 3.2 | 3.2 | 3.2 | 3.2 | 3.2 |
| COP ratio (relative to R134a) | | 101.6 | 101.8 | 101.8 | 102.2 | 102.7 |
| Refrigerating capacity ratio (relative to R134a) | | 100.8 | 101.0 | 101.1 | 101.4 | 102.8 |
| ASHRAE flammability classification | | Class 2L | Class 2L | Class 2 | Class 2 | Class 2 |

Test Example 1-3

The GWP of each mixed refrigerant shown in Examples 1-7 to 1-9, Comparative Examples 1-13 to 1-18, and Reference Example 1-3 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: −10° C.
Condensation temperature: 40° C.
Superheating temperature: 20 K
Supercooling temperature: 0 K
Compressor efficiency: 70%

The definitions of the terms are the same as those in Test Example 1-1.

Table 3 shows the results of Test Example 1-3. Table 3 shows Examples and Comparative Examples with regard to Refrigerant 1 of the present disclosure. In Table 3, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 3

| Item | | Unit | Reference Example 1-3 (R134a) | Comparative Example 1-13 | Comparative Example 1-14 | Comparative Example 1-15 | Example 1-7 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 80.8 | 80.7 | 85.5 | 90.8 | 91.8 |
| Saturation pressure (40° C.) | | MPa | 1.017 | 1.004 | 0.995 | 0.991 | 0.990 |
| Evaporation pressure | | MPa | 0.201 | 0.215 | 0.232 | 0.209 | 0.208 |
| Compression ratio | | — | 5.1 | 4.7 | 4.7 | 4.7 | 4.7 |
| COP ratio (relative to R134a) | | % | 100.0 | 100.2 | 100.9 | 101.5 | 101.6 |
| Refrigerating capacity ratio (relative to R134a) | | % | 100.0 | 101.6 | 102.4 | 103.0 | 103.1 |
| ASHRAE flammability classification | | — | Class 1 | Class 2L | Class 2L | Class 2L | Class 2L |

| Item | | Example 1-8 | Example 1-9 | Comparative Example 1-16 | Comparative Example 1-17 | Comparative Example 1-18 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0 |

TABLE 3-continued

|  |  |  |  |  |  |
|---|---|---|---|---|---|
| HFC-134a | 0 | 0 | 0 | 0 | 0 |
| GWP (AR4) | 7 | 8 | 8 | 8 | 10 |
| Discharge temperature | 93.3 | 94.8 | 95.3 | 100.3 | 115.9 |
| Saturation pressure (40° C.) | 0.988 | 0.987 | 0.986 | 0.981 | 0.968 |
| Evaporation pressure | 0.208 | 0.207 | 0.207 | 0.204 | 0.198 |
| Compression ratio | 4.8 | 4.8 | 4.8 | 4.8 | 4.9 |
| COP ratio (relative to R134a) | 101.7 | 101.8 | 101.8 | 102.0 | 102.4 |
| Refrigerating capacity ratio (relative to R134a) | 103.2 | 103.3 | 103.4 | 103.6 | 104.4 |
| ASHRAE flammability classification | Class 2L | Class 2L | Class 2 | Class 2 | Class 2 |

Test Example 1-4

The GWP of each mixed refrigerant shown in Examples 1-10 to 1-12, Comparative Examples 1-19 to 1-24, and Reference Example 1-4 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using using Refprop 10.0 of the National Institute of Science and Technology (NIST) 10.0 under the following conditions.

Air-Conditioning Conditions
Evaporation temperature: −35° C.
Condensation temperature: 40° C.
Superheating temperature: 20 K
Supercooling temperature: 0 K
Compressor efficiency: 70%

The definitions of the terms are the same as those in Test Example 1-1.

Table 4 shows the results of Test Example 1-4. Table 4 shows Examples and Comparative Examples with regard to the Refrigerant 1 of the present disclosure. In Table 4, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1 by using a measurement device according to ASTM E681-09 (see FIG. 1).

TABLE 4

| Item | | Unit | Reference Example 1-4 (R134a) | Comparative Example 1-19 | Comparative Example 1-20 | Comparative Example 1-21 | Example 1-10 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 99.1 | 98.5 | 106.5 | 115.5 | 117.2 |
| Saturation pressure (40° C.) | | MPa | 1.017 | 1.004 | 0.998 | 0.991 | 0.990 |
| Evaporation pressure | | MPa | 0.066 | 0.076 | 0.075 | 0.073 | 0.073 |
| Compression ratio | | — | 15.4 | 13.2 | 13.4 | 13.6 | 13.6 |
| COP ratio (relative to R134a) | | % | 100.0 | 100.7 | 102.2 | 100.2 | 100.4 |
| Refrigerating capacity ratio (relative to R134a) | | % | 100.0 | 108.8 | 110.4 | 100.2 | 100.4 |
| ASHRAE flammability classification | | — | Class 1 | Class 2L | Class 2L | Class 2L | Class 2L |

| Item | | Example 1-11 | Example 1-12 | Comparative Example 1-22 | Comparative Example 1-23 | Comparative Example 1-24 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0.0 |
| | HFC-134a | 0 | 0 | 0 | 0 | 0 |
| GWP (AR4) | | 7 | 8 | 8 | 8 | 10 |
| Discharge temperature | | 119.7 | 122.2 | 123.1 | 131.5 | 157.8 |
| Saturation pressure (40° C.) | | 0.988 | 0.987 | 0.986 | 0.981 | 0.968 |
| Evaporation pressure | | 0.073 | 0.072 | 0.072 | 0.071 | 0.068 |
| Compression ratio | | 13.6 | 13.7 | 13.7 | 13.8 | 14.2 |

TABLE 4-continued

| | | | | | |
|---|---|---|---|---|---|
| COP ratio (relative to R134a) | 100.6 | 100.8 | 100.9 | 100.0 | 100.7 |
| Refrigerating capacity ratio (relative to R134a) | 100.6 | 100.9 | 100.9 | 100.0 | 101.3 |
| ASHRAE flammability classification | Class 2L | Class 2L | Class 2 | Class 2 | Class 2 |

Test Example 1-5

The GWP of each mixed refrigerant shown in Examples 1-13 to 1-15, Comparative Examples 1-25 to 1-30, and Reference Example 1-5 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using Refprop 10.0 of the National Institute of Science and Technology (NIST) under the following conditions.

Air-Conditioning Conditions
Evaporation temperature: −50° C.
Condensation temperature: 40° C.
Superheating temperature: 20 K
Supercooling temperature: 0 K
Compressor efficiency: 70%

The definitions of the terms are the same as those in Test Example 1-1.

Table 5 shows the results of Test Example 1-5. Table 5 shows Examples and Comparative Examples with regard to Refrigerant 1 of the present disclosure. In Table 5, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1, by using a measurement device according to ASTM E681-09 (see FIG. 1).

TABLE 5

| Item | | Unit | Reference Example 1-5 (R134a) | Comparative Example 1-25 | Comparative Example 1-26 | Comparative Example 1-27 | Example 1-13 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 114.6 | 113.5 | 123.8 | 135.6 | 137.7 |
| Saturation pressure (40° C.) | | MPa | 1.017 | 1.004 | 0.998 | 0.991 | 0.990 |
| Evaporation pressure | | MPa | 0.029 | 0.036 | 0.035 | 0.034 | 0.034 |
| Compression ratio | | — | 34.5 | 28.1 | 28.5 | 29.0 | 29.0 |
| COP ratio (relative to R134a) | | % | 100.0 | 101.2 | 103.2 | 100.3 | 100.5 |
| Refrigerating capacity ratio (relative to R134a) | | % | 100.0 | 115.2 | 117.5 | 100.2 | 100.5 |
| ASHRAE flammability classification | | — | Class 1 | Class 2L | Class 2L | Class 2L | Class 2L |

| Item | | Example 1-14 | Example 1-15 | Comparative Example 1-28 | Comparative Example 1-29 | Comparative Example 1-30 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0.0 |
| | HFC-134a | 0 | 0 | 0 | 0 | 0 |
| GWP (AR4) | | 7 | 8 | 8 | 8 | 10 |
| Discharge temperature | | 141.0 | 144.2 | 145.3 | 156.4 | 190.6 |
| Saturation pressure (40° C.) | | 0.988 | 0.987 | 0.986 | 0.981 | 0.968 |
| Evaporation pressure | | 0.034 | 0.034 | 0.034 | 0.033 | 0.031 |
| Compression ratio | | 29.2 | 29.3 | 29.3 | 29.7 | 30.9 |
| COP ratio (relative to R134a) | | 100.8 | 101.1 | 101.2 | 100.0 | 101.0 |
| Refrigerating capacity ratio (relative to R134a) | | 100.8 | 101.1 | 101.2 | 100.0 | 101.6 |
| ASHRAE flammability classification | | Class 2L | Class 2L | Class 2 | Class 2 | Class 2 |

Test Example 1-6

The GWP of each mixed refrigerant shown in Examples 1-16 to 1-18, Comparative Examples 1-31 to 1-36, and Reference Example 1-6 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: −65° C.
Condensation temperature: 40° C.
Superheating temperature: 20 K
Supercooling temperature: 0 K
Compressor efficiency: 70%

The definitions of the terms are the same as those in Test Example 1-1.

Table 6 shows the results of Test Example 1-6. Table 6 shows Examples and Comparative Examples with regard to Refrigerant 1 of the present disclosure. In Table 6, the definitions of the terms are the same as those in Test Example 1-1.

The coefficient of performance (COP) and the compression ratio were determined as in Test Example 1-1.

The flammability of the mixed refrigerant was evaluated as in Test Example 1-1. The burning rate test was performed as in Test Example 1-1.

The flammable range of the mixed refrigerant was measured in the same manner and under the same conditions as in Test Example 1-1, by using a measurement device according to ASTM E681-09 (see FIG. 1).

TABLE 6

| Item | | Unit | Reference Example 1-6 (R134a) | Comparative Example 1-31 | Comparative Example 1-32 | Comparative Example 1-33 | Example 1-16 |
|---|---|---|---|---|---|---|---|
| Composition ratio | HFO-1132(Z) | mass % | 0 | 30.0 | 40.0 | 51.0 | 53.0 |
| | HFO-1234yf | mass % | 0 | 70.0 | 60.0 | 49.0 | 47.0 |
| | HFC-134a | mass % | 100 | 0 | 0 | 0 | 0 |
| GWP (AR4) | | — | 1430 | 6 | 6 | 7 | 7 |
| Discharge temperature | | ° C. | 134.8 | 132.8 | 146.1 | 161.0 | 163.8 |
| Saturation pressure (40° C.) | | MPa | 1.017 | 1.004 | 0.998 | 0.991 | 0.990 |
| Evaporation pressure | | MPa | 0.011 | 0.015 | 0.015 | 0.014 | 0.014 |
| Compression ratio | | — | 89.3 | 67.4 | 68.7 | 70.1 | 70.4 |
| COP ratio (relative to R134a) | | % | 100.0 | 101.9 | 104.5 | 106.6 | 106.9 |
| Refrigerating capacity ratio (relative to R134a) | | % | 100.0 | 124.4 | 127.4 | 129.9 | 130.3 |
| ASHRAE flammability classification | | — | Class 1 | Class 2L | Class 2L | Class 2L | Class 2L |

| Item | | Example 1-17 | Example 1-18 | Comparative Example 1-34 | Comparative Example 1-35 | Comparative Example 1-36 |
|---|---|---|---|---|---|---|
| Composition ratio | HFO-1132(Z) | 56.0 | 59.0 | 60.0 | 70.0 | 100 |
| | HFO-1234yf | 44.0 | 41.0 | 40.0 | 30.0 | 0.0 |
| | HFC-134a | 0 | 0 | 0 | 0 | 0 |
| GWP (AR4) | | 7 | 8 | 8 | 8 | 10 |
| Discharge temperature | | 168.0 | 172.1 | 173.5 | 187.7 | 231.5 |
| Saturation pressure (40° C.) | | 0.988 | 0.987 | 0.986 | 0.981 | 0.968 |
| Evaporation pressure | | 0.014 | 0.014 | 0.014 | 0.014 | 0.013 |
| Compression ratio | | 70.8 | 71.2 | 71.3 | 72.6 | 76.3 |
| COP ratio (relative to R134a) | | 107.4 | 107.8 | 107.9 | 108.9 | 110.2 |
| Refrigerating capacity ratio (relative to R134a) | | 130.8 | 131.3 | 131.4 | 132.7 | 134.9 |
| ASHRAE flammability classification | | Class 2L | Class 2L | Class 2 | Class 2 | Class 2 |

Test Example 2-1

The GWP of each mixed refrigerant shown in Examples 2-1 to 2-4, Comparative Examples 2-1 to 2-6, and Reference Example 2-1 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National. Institute of Science and Technology (NIST) under the following conditions.

Air-Conditioning Conditions
Evaporation temperature: 10° C.
Condensation temperature: 40° C.

Superheating temperature: 20 K
Supercooling temperature: 0 K
Compressor efficiency: 70%

The "evaporation temperature of 10° C." means that the evaporation temperature of the mixed refrigerant in the evaporator provided in the refrigeration apparatus is 10° C. Further, the "condensation temperature of 40° C." means that the condensation temperature of the mixed refrigerant in the condenser provided in the refrigeration apparatus is 40° C.

Table 7 shows the results of Test Example 2-1. Table 7 shows Examples and Comparative Examples with regard to Refrigerant 2 of the present disclosure. In Table 7, the "COP ratio" and the "refrigerating capacity ratio" refer to a ratio (%) relative to R134a. In Table 7, the "saturation pressure (40° C.)" refers to a saturation pressure at a saturation temperature of 40° C. In Table 7, the "discharge temperature (° C.)" refers to a temperature at which the highest temperature is attained in the refrigeration cycle according to the refrigeration cycle theoretical calculations of the mixed refrigerant.

The coefficient of performance (COP) was calculated according to the following equation.

COP=(refrigerating capacity or heating capacity)/
amount of electrical power consumed The compression ratio was calculated according to the following equation.

Compression ratio=condensation pressure (Mpa)/
evaporation pressure (Mpa)

The flammability of the mixed refrigerant was determined by specifying the fractionation of the mixed refrigerant to the WCF concentration and measuring the burning rate according to ANSI/ASHRAE Standard 34-2013. The flammability of R134a was determined by specifying the composition of the mixed refrigerant to the WCF concentration, and measuring the burning rate according to ANSI/ASHRAE Standard 34-2013.

The mixed solvent with a burning rate of 0 cm/s to 10 cm/s was classified as Class 2L (slightly flammable), and the mixed solvent with a burning rate of more than 10 cm/s was classified as Class 2 (weakly flammable). R134a with no flame propagation was classified as Class 1 (non-flammable). In Table 7, the ASHRAE flammability classification shows the results based on these criteria.

The burning rate test was performed as follows. First, a mixed refrigerant having a purity of 99.5% or more was used; and the mixed refrigerant was deaerated by repeating a cycle of freezing, pumping, and thawing until no trace of air was observed on the vacuum gauge. The burning rate was measured by a closed method. The initial temperature was the ambient temperature. The ignition was performed by generating an electrical spark between the electrodes in the center of the sample cell. The duration of the discharge was 1.0 to 9.9 ms, and the ignition energy was typically about 0.1 to 1.0 J. The spread of the flame was visualized by using a schlieren photograph. A cylindrical container (inner diameter: 155 mm, length: 198 mm) having two acrylic windows that transmit light was used as a sample cell, and a xenon lamp was used as a light source. The schlieren image of the flame was recorded using a high-speed digital video camera at a frame speed of 600 fps, and stored in a PC.

The flammable range of the mixed refrigerant was measured using a measurement device according to ASTM E681-09 (see FIG. 1).

More specifically, a 12-L spherical glass flask was used so that the combustion state could be visually observed and photographically recorded. When excessive pressure was generated by combustion in the glass flask, gas was allowed to escape from the upper lid. Ignition was achieved by electric discharge from electrodes disposed at one-third the distance from the bottom.

Test Conditions
Test vessel: 280-mm φ spherical (internal volume: 12 liters)
Test temperature: 60° C.±3° C.
Pressure: 101.3 kPa±0.7 kPa
Water: 0.0088 g±0.0005 g (water content at a relative humidity of 50% at 23° C.) per gram of dry air
Mixing ratio of refrigerant composition/air: 1 vol. % increments±0.2 vol. %
Mixture of refrigerant composition: ±0.1 mass %
Ignition method: AC discharge, voltage: 15 kV, electric current: 30 mA, neon transformer
Electrode spacing: 6.4 mm (¼ inch)
Spark: 0.4 seconds±0.05 seconds
Evaluation Criteria:
When the flame spread at an angle of more than 90° from the ignition point, it was evaluated that flame propagation was present (flammable).
When the flame spread at an angle of 90° or less from the ignition point, it was evaluated that flame propagation was absent (non-flammable).

TABLE 7

| Item | | Unit | Reference Example 2-1 (R134a) | Comparative Example 2-1 | Comparative Example 2-2 | Example 2-1 | Example 2-2 | Example 2-3 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 70.7 | 70.7 | 73.4 | 73.6 | 74.4 | 75.3 |
| Saturation pressure (40° C.) | | MPa | 1.017 | 1.004 | 0.998 | 0.997 | 0.995 | 0.994 |
| Evaporation pressure | | MPa | 0.415 | 0.427 | 0.422 | 0.422 | 0.421 | 0.420 |
| Compression ratio | | — | 2.5 | 2.4 | 2.4 | 2.4 | 2.4 | 2.4 |
| COP ratio (relative to R134a) | | % | 100.0 | 100.0 | 100.2 | 100.2 | 100.2 | 100.3 |
| Refrigerating capacity ratio (relative to R134a) | | % | 100.0 | 98.0 | 98.1 | 98.2 | 98.2 | 98.2 |
| ASHRAE flammability classification | | — | Class 1 | Class 2L | Class 2L | Class 2L | Class 2L | Class 2L |

TABLE 7-continued

| Item | | Example 2-4 | Comparative Example 2-3 | Comparative Example 2-4 | Comparative Example 2-5 | Comparative Example 2-6 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0 |
| | HFC-134a | 0 | 0 | 0 | 0 | 0 |
| GWP (AR4) | | 7 | 7 | 8 | 8 | 10 |
| Discharge temperature | | 75.8 | 76.3 | 78.8 | 81.6 | 90.3 |
| Saturation pressure (40° C.) | | 0.992 | 0.991 | 0.986 | 0.981 | 0.968 |
| Evaporation pressure | | 0.419 | 0.418 | 0.415 | 0.411 | 0.402 |
| Compression ratio | | 2.4 | 2.4 | 2.4 | 2.4 | 2.4 |
| COP ratio (relative to R134a) | | 100.3 | 100.3 | 100.4 | 100.5 | 100.4 |
| Refrigerating capacity ratio (relative to R134a) | | 98.2 | 98.3 | 98.3 | 98.4 | 98.5 |
| ASHRAE flammability classification | | Class 2L | Class 2L | Class 2 | Class 2 | Class 2 |

Test Example 2-2

The GWP of each mixed refrigerant shown in Examples 2-5 to 2-8, Comparative Examples 2-7 to 2-12, and Reference Example 2-2 (R134a) was evaluated based on the values in the Fourth Assessment Report of the IPCC.

The COP, refrigerating capacity, discharge temperature, saturation pressure at a saturation temperature of 45° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: 5° C.
Condensation temperature: 45° C.
Superheating temperature: 5 K
Supercooling temperature: 5 K
Compressor efficiency: 70%

The definitions of the terms are the same as those in Test Example 2-1.

Table 8 shows the results of Test Example 2-2. Table 6 shows Examples and Comparative Examples with regard to Refrigerant 2 of the present disclosure. In Table 8, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1, using a measurement device according to ASTM E681-09 (see FIG. 1).

TABLE 8

| Item | | Unit | Reference Example 2-2 (R134a) | Comparative Example 2-7 | Comparative Example 2-8 | Example 2-5 | Example 2-6 | Example 2-7 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 63.8 | 63.9 | 67.3 | 67.7 | 68.7 | 69.7 |
| Saturation pressure (45° C.) | | MPa | 1.160 | 1.139 | 1.133 | 1.132 | 1.130 | 1.129 |
| Evaporation pressure | | MPa | 0.350 | 0.363 | 0.359 | 0.359 | 0.358 | 0.357 |
| Compression ratio | | — | 3.3 | 3.1 | 3.2 | 3.2 | 3.2 | 3.2 |
| COP ratio (relative to R134a) | | % | 100.0 | 100.0 | 100.7 | 100.8 | 101.0 | 101.2 |
| Refrigerating capacity ratio (relative to R134a) | | % | 100.0 | 98.8 | 99.7 | 99.8 | 100.0 | 100.2 |
| ASHRAE flammability classification | | — | Class 1 | Class 2L | Class 2L | Class 2L | Class 2L | Class 2L |

| Item | | Example 2-8 | Comparative Example 2-9 | Comparative Example 2-10 | Comparative Example 2-11 | Comparative Example 2-12 |
|---|---|---|---|---|---|---|
| Composition ratio | HFO-1132(Z) | 49.0 | 51.0 | 60.0 | 70.0 | 100 |

TABLE 8-continued

|  |  |  |  |  |  |
|---|---|---|---|---|---|
| HFO-1234yf | 51.0 | 49.0 | 40.0 | 30.0 | 0 |
| HFC-134a | 0 | 0 | 0 | 0 | 0 |
| GWP (AR4) | 7 | 7 | 8 | 8 | 10 |
| Discharge temperature | 70.4 | 71.2 | 74.4 | 78.0 | 89.4 |
| Saturation pressure (45° C.) | 1.127 | 1.126 | 1.121 | 1.115 | 1.101 |
| Evaporation pressure | 0.356 | 0.355 | 0.352 | 0.349 | 0.340 |
| Compression ratio | 3.2 | 3.2 | 3.2 | 3.2 | 3.2 |
| COP ratio (relative to R134a) | 101.3 | 101.4 | 101.8 | 102.2 | 102.7 |
| Refrigerating capacity ratio (relative to R134a) | 100.4 | 100.5 | 101.1 | 101.6 | 102.8 |
| ASHRAE flammability classification | Class 2L | Class 2L | Class 2 | Class 2 | Class 2 |

Test Example 2-3

The GWP of each mixed refrigerant shown in Examples 2-9 to 2-12, Comparative Examples 2-13 to 2-18, and Reference Example 2-3 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using Refprop 10.0 of the National Institute of Science and Technology (NIST) under the following conditions.

Air-Conditioning Conditions
Evaporation temperature: −10° C.
Condensation temperature: 40° C.
Superheating temperature: 20 K
Supercooling temperature: 0 K
Compressor efficiency: 70%

The definitions of the terms are the same as those in Test Example 2-1.

Table 9 shows the results of Test Example 2-3. Table 9 shows Examples and Comparative Examples with regard to Refrigerant 2 of the present disclosure. In Table 9, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1, by using a measurement device according to ASTM E681-09 (see FIG. 1).

TABLE 9

| Item | | Unit | Reference Example 2-3 (R134a) | Comparative Example 2-13 | Comparative Example 2-14 | Example 2-9 | Example 2-10 | Example 2-11 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 80.8 | 80.7 | 85.5 | 85.9 | 87.4 | 88.8 |
| Saturation pressure (40° C.) | | MPa | 1.017 | 1.004 | 0.998 | 0.997 | 0.995 | 0.994 |
| Evaporation pressure | | MPa | 0.201 | 0.215 | 0.212 | 0.212 | 0.211 | 0.210 |
| Compression ratio | | — | 5.1 | 4.7 | 4.7 | 4.7 | 4.7 | 4.7 |
| COP ratio (relative to R134a) | | % | 100.0 | 100.2 | 100.9 | 101.0 | 101.1 | 101.3 |
| Refrigerating capacity ratio (relative to R134a) | | % | 100.0 | 101.6 | 102.4 | 102.4 | 102.6 | 102.8 |
| ASHRAE flammability classification | | — | Class 1 | Class 2L | Class 2L | Class 2L | Class 2L | Class 2L |

| Item | | Example 2-12 | Comparative Example 2-15 | Comparative Example 2-16 | Comparative Example 2-17 | Comparative Example 2-18 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0 |
| | HFC-134a | 0 | 0 | 0 | 0 | 0 |
| GWP (AR4) | | 7 | 7 | 8 | 8 | 10 |
| Discharge temperature | | 89.8 | 90.8 | 95.3 | 100.3 | 115.9 |
| Saturation pressure (40° C.) | | 0.992 | 0.991 | 0.986 | 0.981 | 0.968 |

TABLE 9-continued

| | | | | | |
|---|---|---|---|---|---|
| Evaporation pressure | 0.209 | 0.209 | 0.207 | 0.204 | 0.198 |
| Compression ratio | 4.7 | 4.7 | 4.8 | 4.8 | 4.8 |
| COP ratio (relative to R134a) | 101.4 | 101.5 | 101.8 | 102.0 | 102.4 |
| Refrigerating capacity ratio (relative to R134a) | 102.9 | 103.0 | 103.4 | 103.6 | 104.4 |
| ASHRAE flammability classification | Class 2L | Class 2L | Class 2 | Class 2 | Class 2 |

Test Example 2-4

The GWP of each mixed refrigerant shown in Examples 2-13 to 2-16, Comparative Examples 2-19 to 2-24, and Reference Example 2-4 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants using using Refprop 10.0 of the National Institute of Science and Technology (NIST) under the following conditions.

Air-Conditioning Conditions
Evaporation temperature: −35° C.
Condensation temperature: 40° C.
Superheating temperature: 20 K
Supercooling temperature: 0 K
Compressor efficiency: 70%

The definitions of the terms are the same as those in Test Example 2-1.

Table 10 shows the results of Test Example 2-4. Table 10 shows Examples and Comparative Examples with regard to Refrigerant 2 of the present disclosure. In Table 10, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1, by using a measurement device according to ASTM E681-09 (see FIG. 1).

TABLE 10

| Item | | Unit | Reference Example 2-4 (R134a) | Comparative Example 2-19 | Comparative Example 2-20 | Example 2-13 | Example 2-14 | Example 2-15 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 99.1 | 98.5 | 106.5 | 107.3 | 109.8 | 112.2 |
| Saturation pressure (40° C.) | | MPa | 1.017 | 1.004 | 0.998 | 0.997 | 0.995 | 0.994 |
| Evaporation pressure | | MPa | 0.066 | 0.076 | 0.075 | 0.074 | 0.074 | 0.074 |
| Compression ratio | | — | 15.4 | 13.2 | 13.4 | 13.4 | 13.5 | 13.5 |
| COP ratio (relative to R134a) | | % | 100.0 | 100.7 | 102.2 | 102.3 | 102.7 | 103.0 |
| Refrigerating capacity ratio (relative to R134a) | | % | 100.0 | 108.8 | 110.4 | 110.5 | 110.9 | 111.3 |
| ASHRAE flammability classification | | — | Class 1 | Class 2L | Class 2L | Class 2L | Class 2L | Class 2L |

| Item | | Example 2-16 | Comparative Example 2-21 | Comparative Example 2-22 | Comparative Example 2-23 | Comparative Example 2-24 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0.0 |
| | HFC-134a | 0 | 0 | 0 | 0 | 0 |
| GWP (AR4) | | 7 | 7 | 8 | 8 | 10 |
| Discharge temperature | | 113.9 | 115.5 | 123.1 | 131.5 | 157.8 |
| Saturation pressure (40° C.) | | 0.992 | 0.991 | 0.986 | 0.981 | 0.968 |
| Evaporation pressure | | 0.073 | 0.073 | 0.072 | 0.072 | 0.068 |
| Compression ratio | | 13.5 | 13.6 | 13.7 | 13.8 | 14.2 |
| COP ratio (relative to R134a) | | 100.0 | 100.2 | 100.9 | 100.0 | 100.7 |

TABLE 10-continued

|  |  |  |  |  |  |
|---|---|---|---|---|---|
| Refrigerating capacity ratio (relative to R134a) | 100.0 | 100.2 | 100.9 | 100.0 | 101.3 |
| ASHRAE flammability classification | Class 2L | Class 2L | Class 2 | Class 2 | Class 2 |

Test Example 2-5

The GWP of each mixed refrigerant shown in Examples 2-17 to 2-20, Comparative Examples 2-25 to 2-30, and Reference Example 2-5 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: −50° C.
Condensation temperature: 40° C.
Superheating temperature: 20 K
Supercooling temperature: 0 K
Compressor efficiency: 70%

The definitions of the terms are the same as those in Test Example 2-1.

Table 11 shows the results of Test Example 2-5. Table 11 shows Examples and Comparative Examples with regard to Refrigerant 2 of the present disclosure. In Table 11, the definitions of the terms are the same as those in Test Example 2-1.

The coefficient of performance (COP) and the compression ratio were determined as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1, by using a measurement device according to ASTM E681-09 (see FIG. 1).

TABLE 11

| Item | | Unit | Reference Example 2-5 (R134a) | Comparative Example 2-25 | Comparative Example 2-26 | Example 2-17 | Example 2-18 | Example 2-19 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 114.6 | 113.5 | 123.8 | 124.9 | 128.1 | 131.3 |
| Saturation pressure (40° C.) | | MPa | 1.017 | 1.004 | 0.998 | 0.997 | 0.995 | 0.994 |
| Evaporation pressure | | MPa | 0.029 | 0.036 | 0.035 | 0.035 | 0.035 | 0.035 |
| Compression ratio | | — | 34.5 | 28.1 | 28.5 | 28.5 | 28.7 | 28.8 |
| COP ratio (relative to R134a) | | % | 100.0 | 101.2 | 103.2 | 103.4 | 103.9 | 104.3 |
| Refrigerating capacity ratio (relative to R134a) | | % | 100.0 | 115.2 | 117.5 | 117.7 | 118.2 | 118.7 |
| ASHRAE flammability classification | | — | Class 1 | Class 2L | Class 2L | Class 2L | Class 2L | Class 2L |

| Item | | Example 2-20 | Comparative Example 2-27 | Comparative Example 2-28 | Comparative Example 2-29 | Comparative Example 2-30 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0.0 |
| | HFC-134a | 0 | 0 | 0 | 0 | 0 |
| GWP (AR4) | | 7 | 7 | 8 | 8 | 10 |
| Discharge temperature | | 133.4 | 135.6 | 145.3 | 156.4 | 190.6 |
| Saturation pressure (40° C.) | | 0.992 | 0.991 | 0.986 | 0.981 | 0.968 |
| Evaporation pressure | | 0.034 | 0.034 | 0.034 | 0.033 | 0.031 |
| Compression ratio | | 28.9 | 29.0 | 29.3 | 29.7 | 30.9 |
| COP ratio (relative to R134a) | | 100.0 | 100.3 | 101.2 | 100.0 | 101.0 |
| Refrigerating capacity ratio (relative to R134a) | | 100.0 | 100.2 | 101.2 | 100.0 | 101.6 |
| ASHRAE flammability classification | | Class 2L | Class 2L | Class 2 | Class 2 | Class 2 |

Test Example 2-6

The GWP of each mixed refrigerant shown in Examples 2-21 to 2-24, Comparative Examples 2-31 to 2-36, and Reference Example 2-6 (R134a) was evaluated based on the values in the Fourth Assessment Report of the IPCC.

The COP, refrigerating capacity, discharge temperature, saturation pressure at a saturation temperature of 40° C., condensation pressure, and evaporation pressure of each of the mixed refrigerants were determined by performing refrigeration cycle theoretical calculations for the mixed refrigerants by using Refprop 10.0 of the National Institute of Science and Technology (NIST) under the following conditions.

Air-Conditioning Conditions
Evaporation temperature: −65° C.
Condensation temperature: 40° C.
Superheating temperature: 20 K
Supercooling temperature: 0 K
Compressor efficiency: 70%

The definitions of the terms are the same as those in Test Example 2-1.

Table 12 shows the results of Test Example 2-6. Table 12 shows Examples and Comparative Examples with regard to Refrigerant 2 of the present disclosure. In Table 12, the meanings of the terms are the same as those of Example 2-1.

The coefficient of performance (COP) and the compression ratio were obtained in the same manner as in Test Example 2-1.

The flammability of the mixed refrigerant was evaluated as in Test Example 2-1. The burning rate test was performed as in Test Example 2-1.

The flammable range of the mixed refrigerant was measured in the same manner and under the same conditions as in Test Example 2-1, by using a measurement device according to ASTM E681-09 (see FIG. 1).

TABLE 12

| Item | | Unit | Reference Example 2-6 (R134a) | Comparative Example 2-31 | Comparative Example 2-32 | Example 2-21 | Example 2-22 | Example 2-23 |
|---|---|---|---|---|---|---|---|---|
| Composition ratio | HFO-1132(Z) | mass % | 0 | 30.0 | 40.0 | 41.0 | 44.0 | 47.0 |
| | HFO-1234yf | mass % | 0 | 70.0 | 60.0 | 59.0 | 56.0 | 53.0 |
| | HFC-134a | mass % | 100 | 0 | 0 | 0 | 0 | 0 |
| GWP (AR4) | | — | 1430 | 6 | 6 | 6 | 7 | 7 |
| Discharge temperature | | ° C. | 134.8 | 132.8 | 146.1 | 147.4 | 151.5 | 155.6 |
| Saturation pressure (40° C.) | | MPa | 1.017 | 1.004 | 0.998 | 0.997 | 0.995 | 0.994 |
| Evaporation pressure | | MPa | 0.011 | 0.015 | 0.015 | 0.014 | 0.014 | 0.014 |
| Compression ratio | | — | 89.3 | 67.4 | 68.7 | 68.8 | 69.2 | 69.6 |
| COP ratio (relative to R134a) | | % | 100.0 | 101.9 | 104.5 | 104.7 | 105.3 | 105.9 |
| Refrigerating capacity ratio (relative to R134a) | | % | 100.0 | 124.4 | 127.4 | 127.7 | 128.4 | 129.1 |
| ASHRAE flammability classification | | — | Class 1 | Class 2L | Class 2L | Class 2L | Class 2L | Class 2L |

| Item | | Example 2-24 | Comparative Example 2-33 | Comparative Example 2-34 | Comparative Example 2-35 | Comparative Example 2-36 |
|---|---|---|---|---|---|---|
| Composition ratio | HFO-1132(Z) | 49.0 | 51.0 | 60.0 | 70.0 | 100 |
| | HFO-1234yf | 51.0 | 49.0 | 40.0 | 30.0 | 0.0 |
| | HFC-134a | 0 | 0 | 0 | 0 | 0 |
| GWP (AR4) | | 7 | 7 | 8 | 8 | 10 |
| Discharge temperature | | 158.3 | 161.0 | 173.5 | 187.7 | 231.5 |
| Saturation pressure (40° C.) | | 0.992 | 0.991 | 0.986 | 0.981 | 0.968 |
| Evaporation pressure | | 0.014 | 0.014 | 0.014 | 0.014 | 0.013 |
| Compression ratio | | 69.9 | 70.1 | 71.3 | 72.6 | 76.3 |
| COP ratio (relative to R134a) | | 106.3 | 106.6 | 107.9 | 108.9 | 110.2 |
| Refrigerating capacity ratio (relative to R134a) | | 129.5 | 129.9 | 131.4 | 132.7 | 134.9 |
| ASHRAE flammability classification | | Class 2L | Class 2L | Class 2 | Class 2 | Class 2 |

The present disclosure provides the invention according to the following embodiments.

Item 1.

A composition comprising a refrigerant, the refrigerant comprising cis-1,2-difluoroethylene (HFO-1132(Z)) and 2,3,3,3-tetrafluoropropene (HFO-1234yf), wherein HFO-1132(Z) is present in an amount of 53.0 to 59.5 mass %, and HFO-1234yf is present in an amount of 47.0 to 40.5 mass %, based on the total mass of HFO-1132(Z) and HFO-1234yf.

Item 2.

The composition according to Item 1, wherein the refrigerant is for use in operating a refrigeration cycle in which the evaporation temperature is −60 to 20° C.

Item 3.

The composition according to Item 1 or 2, wherein the refrigerant consists of HFO-1132(Z) and HFO-1234yf.

Item 4.
A composition comprising a refrigerant,
the refrigerant comprising cis-1,2-difluoroethylene (HFO-1132(Z)) and 2,3,3,3-tetrafluoropropene (HFO-1234yf),
wherein HFO-1132(Z) is present in an amount of 41.0 to 49.2 mass %, and HFO-1234yf is present in an amount of 59.0 to 50.8 mass %, based on the total mass of HFO-1132(Z) and HFO-1234yf.

Item 5.
The composition according to Item 4, wherein the refrigerant is for use in operating a refrigeration cycle in which the evaporation temperature is −60 to 20° C.

Item 6.
The composition according to Item 4 or 5, wherein the refrigerant consists of HFO-1132(Z) and HEO-1234yf.

Item 7.
The composition according to any one of Items 1 to 6, which is for use as an alternative refrigerant for R134a, R22, R12, R404A, R407A, R407C, R407F, R407H, R410A, R413A, R417A, R422A, R422B, R422C, R422D, R423A, R424A, R426A, R427A, R428A, R430A, R434A, R437A, R439A, R448A, R449A, R449B, R449C, R450A, R452A, R452B, R454A, R452B, R454C, R455A, R465A, R502, R507, R513A, R513B, R515A, or R515B.

Item 8.
The composition according to any one of Items 1 to 7, comprising at least one substance selected from the group consisting of water, tracers, ultraviolet fluorescent dyes, stabilizers, and polymerization inhibitors.

Item 9.
The composition according to any one of Items 1 to 8, the composition further comprising a refrigerant oil and being for use as a working fluid for a refrigeration apparatus.

Item 10.
The composition according to item 9, wherein the refrigerant oil contains at least one polymer selected from the group consisting of polyalkylene glycol (PAG), polyol ester (POE), and polyvinyl ether (PVE).

Item 11.
A refrigeration method comprising operating a refrigeration cycle using the composition of any one of Items 1 to 10.

Item 12.
A refrigeration method comprising operating a refrigeration cycle using a composition comprising a refrigerant, the refrigerant comprising trans-1,2-difluoroethylene (HFO-1132(Z)) and 2,3,3,3-tetrafluoropropene (HFO-1234yf),
wherein HFO-1132(Z) is present in an amount of 53.0 to 59.5 mass %, and HFO-1234yf is present in an amount of 47.0 to 40.5 mass %, based on the total mass of HFO-1132(E) and HFO-1234yf.

Item 13.
The refrigeration method according to Item 12, wherein the evaporation temperature in the refrigeration cycle is −60 to 20° C.

Item 14.
The composition according to Item 12 or 13, wherein the refrigerant consists of HFO-1132(Z) and HFO-1234yf.

Item 15.
A refrigeration method comprising operating a refrigeration cycle using a composition comprising a refrigerant, the refrigerant comprising trans-1,2-difluoroethylene (HFO-1132(E)) and 2,3,3,3-tetrafluoropropene (HFO-1234yf),
wherein HFO-1132(Z) is present in an amount of 41.0 to 49.2 mass %, and HFO-1234yf is present in an amount of 59.0 to 50.8 mass %, based on the total mass of HFO-1132(Z) and HFO-1234yf.

Item 16.
The refrigeration method according to Item 15, wherein the evaporation temperature in the refrigeration cycle is −60 to 20° C.

Item 17.
The composition according to item 15 or 16, wherein the refrigerant consists of HFO-1132(Z) and HFO-1234yf.

Item 13.
A method for operating a refrigeration apparatus that operates a refrigeration cycle using the composition of any one of Items 1 to 10.

Item 19.
A refrigeration apparatus comprising the composition of any one of Items 1 to 10 as a working fluid.

Item 20.
The refrigeration apparatus according to Item 19, which is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 21.
The composition according to any one of Items 1 to 10, which is for use as a refrigerant.

Item 22.
The composition according to item 21, which is for use as a refrigerant in a refrigeration apparatus.

Item 23.
The composition according to Item 22, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

Item 24.
Use of the composition of any one of Items 1 to 10 as a refrigerant.

Item 25.
The use according to Item 24 in a refrigeration apparatus.

Item 26.
The use according to Item 25, wherein the refrigeration apparatus is an air-conditioning system, a refrigerator, a freezer, a water cooler, an ice maker, a refrigerated showcase, a freezing showcase, a freezing and refrigerating unit, a refrigerating machine for freezing and refrigerating warehouses, an air-conditioning system for vehicles, a turbo refrigerating machine, or a screw refrigerating machine.

DESCRIPTION OF REFERENCE NUMERALS

1: Supply Line
2: Sampling Line
3: Thermometer
4: Pressure Gauge
5: Electrode
6: Stirring Blade (produced by PTFE)

The invention claimed is:
1. A refrigeration method comprising operating a refrigeration cycle using a composition comprising a refrigerant, said method comprising applying the refrigerant as an alternative refrigerant for R134a,
wherein the refrigerant comprises cis-1,2-difluoroethylene (HFO-1132(Z)) and 2,3,3,3-tetralluoropropene (UFO-1234yf), wherein the refrigerant comprises HFO-1132(Z) and HFO-1234yf in such amounts that the sum of HFO-1132(Z) and HFO-1234yf is 99.5 mass % or more, and
wherein HFO-1132(Z) is present in an amount of 53.0 to 59.5 mass %, and HFO- 1234yf is present in an amount of 47.0 to 40.5 mass %, based on the total mass of HFO-1132(Z) and HFO-1234yf.

2. The refrigeration method according to claim 1, wherein the method comprises operating a refrigeration cycle in which the evaporation temperature is −60 to 20° C.

3. The refrigeration method according to claim 1, wherein the refrigerant consists of FIFO-1132(Z) and HFO-1234yf.

4. A refrigeration method comprising operating a refrigeration cycle using a composition comprising a refrigerant, said method comprising applying the refrigerant as an alternative refrigerant for R134a,
wherein the refrigerant comprises cis-1,2-difluoroethylene (HFO-1132(Z)) and 2,3,3,3-tetrafluoropropene HFO-1234yf,
wherein the refrigerant comprises HFO-1132(Z) and HFO-1234yf in such amounts that the sum of HFO-1132(Z) and HFO-1234yf is 99.5 mass % or more, and
wherein HFO-1132(Z) is present in an amount of 41.0 to 49.2 mass %, and HFO-1234yf is present in an amount of 59.0 to 50.8 mass %, based on the total mass of HFO-1132(Z) and HFO-1234yf.

5. The refrigeration method according to claim 4, wherein the method comprises operating a refrigeration cycle in which the evaporation temperature is −60 to 20° C.

6. The refrigeration method according to claim 4, wherein the refrigerant consists of HFO-1132(Z) and HFO-1234yf.

7. The refrigeration method according to claim 1, wherein the composition comprises at least one substance selected from the group consisting of water, tracers, ultraviolet fluorescent dyes, stabilizers, and polymerization inhibitors.

8. The refrigeration method according to claim 1, wherein the composition further comprises a refrigerant oil and being for use as a working fluid for a refrigeration apparatus.

9. The refrigeration method according to claim 8, wherein the refrigerant oil contains at least one polymer selected from the group consisting of polyalkylene glycol (PAG), polyol ester (POE), and polyvinyl ether (PVE).

* * * * *